(12) United States Patent
Kirkwood et al.

(10) Patent No.: US 7,103,607 B1
(45) Date of Patent: Sep. 5, 2006

(54) BUSINESS VOCABULARY DATA RETRIEVAL USING ALTERNATIVE FORMS

(75) Inventors: Michael Kirkwood, San Francisco, CA (US); Sima Yazdani, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 130 days.

(21) Appl. No.: 09/908,947

(22) Filed: Jul. 18, 2001

Related U.S. Application Data

(60) Provisional application No. 60/252,378, filed on Nov. 20, 2000.

(51) Int. Cl.
*G06F 17/30* (2006.01)

(52) U.S. Cl. ............... 707/102; 707/3; 707/4
(58) Field of Classification Search .......... 707/2, 707/102, 3, 10, 100; 704/10; 715/532, 536
See application file for complete search history.

(56) References Cited

U.S. PATENT DOCUMENTS

| | | | |
|---|---|---|---|
| 5,251,314 A | | 10/1993 | Williams |
| 5,283,894 A | | 2/1994 | Deran |
| 5,386,556 A | * | 1/1995 | Hedin et al. ............ 707/4 |
| 5,404,506 A | * | 4/1995 | Fujisawa et al. ........ 707/4 |
| 5,584,024 A | * | 12/1996 | Shwartz ................. 707/4 |
| 5,594,837 A | * | 1/1997 | Noyes .................... 707/2 |
| 5,644,740 A | * | 7/1997 | Kiuchi ................... 345/853 |
| 5,678,045 A | * | 10/1997 | Bettels .................. 707/200 |
| 5,696,916 A | * | 12/1997 | Yamazaki et al. ....... 345/853 |
| 5,706,501 A | * | 1/1998 | Horikiri et al. ......... 707/10 |
| 5,740,425 A | * | 4/1998 | Povilus ................... 707/100 |
| 5,752,023 A | | 5/1998 | Choucri et al. |
| 5,860,073 A | | 1/1999 | Ferrel et al. |
| 5,875,443 A | * | 2/1999 | Nielsen .................. 707/2 |
| 5,907,837 A | | 5/1999 | Ferrel et al. |
| 5,924,090 A | | 7/1999 | Krellenstein |
| 5,970,490 A | | 10/1999 | Morgenstern |
| 6,038,560 A | * | 3/2000 | Wical .................... 707/5 |
| 6,085,187 A | | 7/2000 | Carter |
| 6,139,201 A | * | 10/2000 | Carbonell et al. ........ 704/2 |

(Continued)

OTHER PUBLICATIONS

Kherfi et al. Image Retrieval from the World Wide Web: Issues, Techniques, and Systems, ACM Computing Surveys, vol. 36, Issue 1, 2004, pp. 35-67.*

(Continued)

*Primary Examiner*—Jean M. Corrielus
*Assistant Examiner*—Baoquoc N. To
(74) *Attorney, Agent, or Firm*—Hickman Palermo Truong & Becker LLP

(57) ABSTRACT

Techniques for responding to a request for data about an enterprise include storing a set of names for a single entity associated with the enterprise as a first set of corresponding concepts in a database. The database stores descriptions of entities associated with the enterprise as concepts and relationships among concepts. A first concept of the set of corresponding concepts is indicated. When a request including data indicating a particular name of the set of names is received, a response is sent that includes information associated in the database with the first concept. This invention yields alternative concepts related to a first, official or "normative" concept for each entity associated with the enterprise in all forms, e.g., languages. Entities include descriptions of products, services and activities of the enterprise. Relating alternative concepts to normative concepts allows a customer to issue a "wrong" query using any of the alternative terms and yet still retrieve the correct information associated with the normative term.

25 Claims, 9 Drawing Sheets

U.S. PATENT DOCUMENTS

| | | | |
|---|---|---|---|
| 6,154,213 A | 11/2000 | Rennison et al. | |
| 6,209,095 B1 | 3/2001 | Anderson et al. | |
| 6,230,173 B1 | 5/2001 | Ferrel et al. | |
| 6,256,627 B1 | 7/2001 | Beattie et al. | |
| 6,315,572 B1 | 11/2001 | Owens et al. | |
| 6,324,536 B1* | 11/2001 | Rofrano | 707/5 |
| 6,327,593 B1 | 12/2001 | Goiffon | |
| 6,349,275 B1* | 2/2002 | Schumacher et al. | 704/8 |
| 6,360,216 B1* | 3/2002 | Hennessey et al. | 707/3 |
| 6,397,217 B1 | 5/2002 | Melbin | |
| 6,438,540 B1 | 8/2002 | Nasr et al. | |
| 6,453,312 B1* | 9/2002 | Goiffon et al. | 707/3 |
| 6,453,315 B1 | 9/2002 | Weissman et al. | |
| 6,480,860 B1 | 11/2002 | Monday | |
| 6,510,406 B1* | 1/2003 | Marchisio | 704/9 |
| 6,510,434 B1 | 1/2003 | Anderson et al. | |
| 6,519,588 B1 | 2/2003 | Leschner | |
| 6,539,374 B1 | 3/2003 | Jung | |
| 6,539,376 B1* | 3/2003 | Sundaresan et al. | 707/5 |
| 6,556,982 B1 | 4/2003 | McGaffey et al. | |
| 6,629,097 B1 | 9/2003 | Keith | |
| 6,665,662 B1* | 12/2003 | Kirkwood et al. | 707/3 |
| 6,675,159 B1* | 1/2004 | Lin et al. | 707/3 |
| 6,735,593 B1 | 5/2004 | Williams | |
| 2001/0056395 A1* | 12/2001 | Khan | 705/37 |
| 2003/0131007 A1 | 7/2003 | Schirmer | |
| 2004/0015503 A1* | 1/2004 | Smith et al. | 707/100 |
| 2004/0034651 A1 | 2/2004 | Gupta et al. | |
| 2004/0181756 A1 | 9/2004 | Berringer et al. | |

OTHER PUBLICATIONS

Information storage and retrieval: a survey and functional description, ACM SIGIR Forum, vol. 12, Issue 2, Fall 1977, p. 12-108.*

Wang et al. Fast trie-based routing lookup with tiny searchable Core, Global Telecommunication Conference, Nov. 17-21, 2002, vol. 3, pp. 2328-2332.*

Goede et al. Sciamachy: an atmospheric chemistry instrument on ENVISTA, vol. 3, Jun. 28 to Jul. 2, 1999.*

Banrji, R.B Theory of problem solving: A branch of artificial intelligence, vol. 70, Issue 12, Dec. 1982.*

Jon Anthony, "Ariadne White Paper: I-Synthesizer, Core Technology Review", Mar. 30, 2001, Version 1.1, Synquiry Technologies, Ltd, pp. 1-36.

Susan Mael, "Synquiry Brings Context and Merchandising to E-Commerce Sites", The Online Reporter, Apr. 23-27, 2001, Issue No. 244, pp. 1-3.

U.S. Appl. No. 09/909,108, filed Jul. 18, 2001, Office Action Mailing Date Jun. 14, 2005.

U.S. Appl. No. 09/909,108, filed Jul. 18, 2001, Office Action Mailing Date Nov. 9, 2005.

* cited by examiner

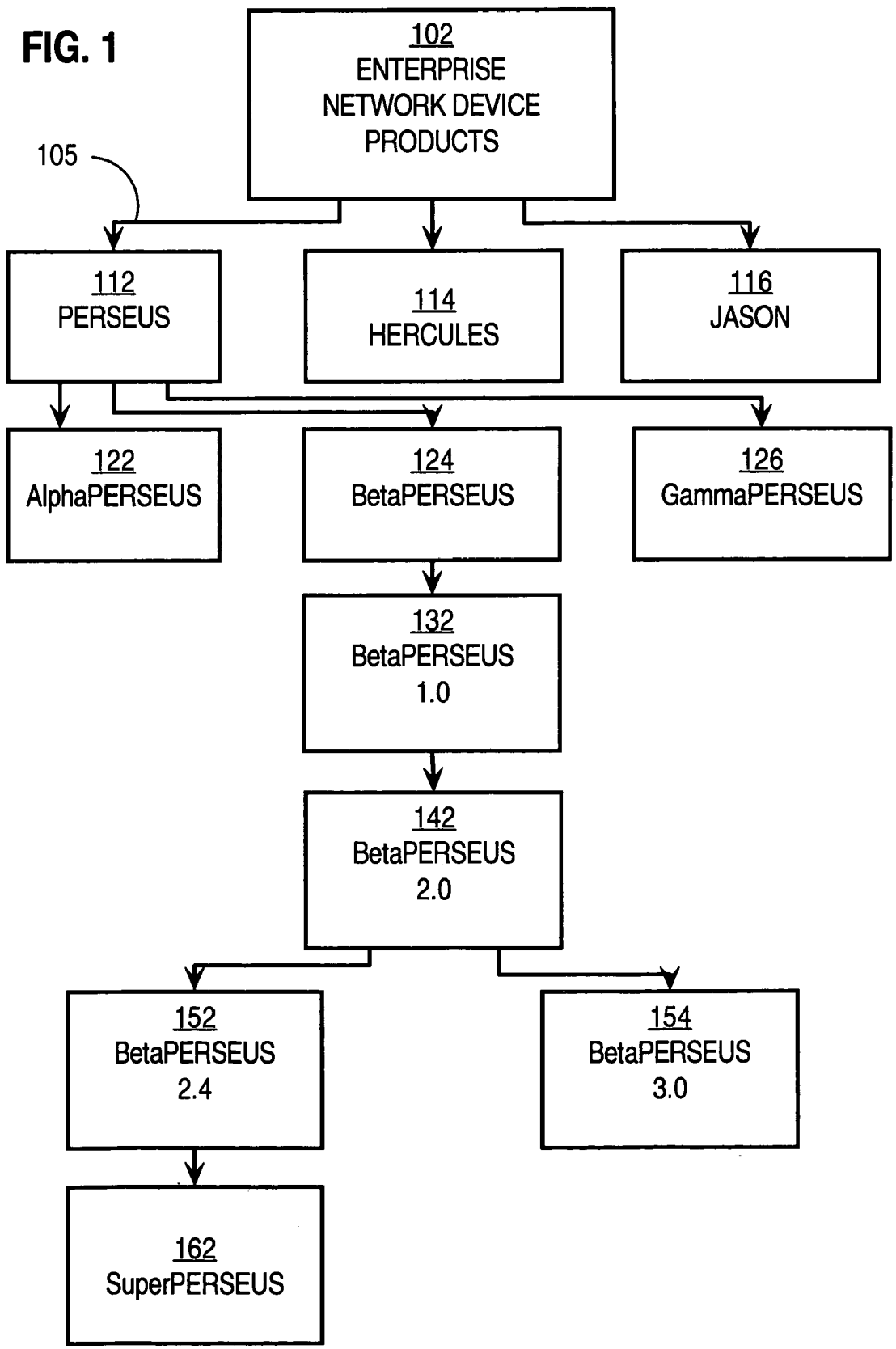

BUSINESS VOCABULARY DATA RETRIEVAL USING ALTERNATIVE FORMS

CROSS-REFERENCE TO RELATED APPLICATIONS

This application is related to and claims domestic priority from prior U.S. Provisional application Ser. No. 60/252,378, filed Nov. 20, 2000, the entire disclosure of which is hereby incorporated by reference as if fully set forth herein. This application is related to prior non-provisional application Ser. No. 09/823,662, filed on Mar. 30, 2001, entitled "Query Translation System for Retrieving Business Vocabulary Terms" by inventors M. Kirkwood, et al., the entire disclosure of which is hereby incorporated by reference as if fully set forth herein. This application is related to prior non-provisional application Ser. No. 09/823,819, filed on Mar. 30, 2001, entitled "Business Vocabulary Data Storage Using Multiple Inter-Related Hierarchies" by inventors M. Kirkwood, et al., the entire disclosure of which is hereby incorporated by reference as if fully set forth herein.

FIELD OF INVENTION

The present invention generally relates to data processing in the field of vocabulary management. The invention relates more specifically to a metadata representation of information or concepts that is tolerant of alternative forms employed in a request by a user.

BACKGROUND OF THE INVENTION

Through economic growth, mergers and acquisitions, business enterprises are becoming ever larger. Further, large business enterprises in the field of high technology now offer ever larger numbers of products and services that derive from an increasingly large variety of technologies.

In this environment, managing the creation, use, and maintenance of the company's intellectual assets, such as products and technologies is an acute problem. As an enterprise grows, maintaining consistent usage of names of products and services throughout the enterprise becomes even more challenging. When an enterprise derives its business opportunities from research and development into new technologies or improvements of existing technologies, maintaining consistent usage of technology designations is a challenge, especially when there is disagreement or confusion about the uses, advantages or benefits of a particular technology. Such confusion can arise whether disagreements arise or not, as when there is insufficient communication between different teams within an enterprise.

The World Wide Web is one communication medium that exacerbates the problem, by showing internal information to the enterprise's partners and customers. Large enterprises that own or operate complex Web sites or other network resources that contain product and technology information face a related problem. Specifically, ensuring consistent usage of product names and technology terms across a large, complicated Web site is problematic. A particular problem involves maintaining consistent use of terms when different parts or elements of the Web site applications are created or content is authored by different individuals or groups.

Yet another problem in this context pertains to retrieving product information and technology information. Visitors to the large enterprise Web site do not necessarily know the "official" name of a product or technology. As a result, new visitors tend to query the Web site for product information based on incorrect terms, imprecise terms, related terms, or names that are unofficial. When a visitor searches using the wrong product name, the visitor is unable to retrieve quality product information, and the visitor may become frustrated. However, this is undesirable from a promotional standpoint; the customer should be able to issue a "wrong" query and yet still retrieve the correct information.

Based on the foregoing, there is a clear need for improved ways to manage one or more vocabularies of all company business practices and pertaining to all business terminology ("concept"), including but not limited to product names and technology terms. In particular, there is a need for a way to structure information so that it can be located and navigated easily even when the user does not know the official terms adopted for the vocabulary.

SUMMARY OF THE INVENTION

The foregoing needs, and other needs and objects that will become apparent from the following description, are achieved in the present invention, which comprises, in one aspect, a method of responding to a request for data about an enterprise. The method includes storing a set of names for a single entity associated with the enterprise as a first set of corresponding concepts in a database. The database stores descriptions of entities associated with the enterprise as concepts and relationships among concepts. A first concept of the set of corresponding concepts is indicated. When a request including data indicating a particular name of the set of names is received, a response is sent that includes information associated in the database with the first concept.

In other aspects, the invention encompasses computer readable media, and systems configured to carry out the foregoing steps.

This invention yields alternative concepts related to a first, "official" or "normative," concept for each entity associated with the enterprise. Entities include products, services and activities of the enterprise. Relating alternative concepts to normative concepts allows a customer to issue a "wrong" query using any of the alternative terms and yet still retrieve the correct information associated with the normative term.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram that illustrates a hypothetical product type hierarchy according to one embodiment

DETAILED DESCRIPTION OF THE PREFERRED EMBODIMENT

Figure 2A:
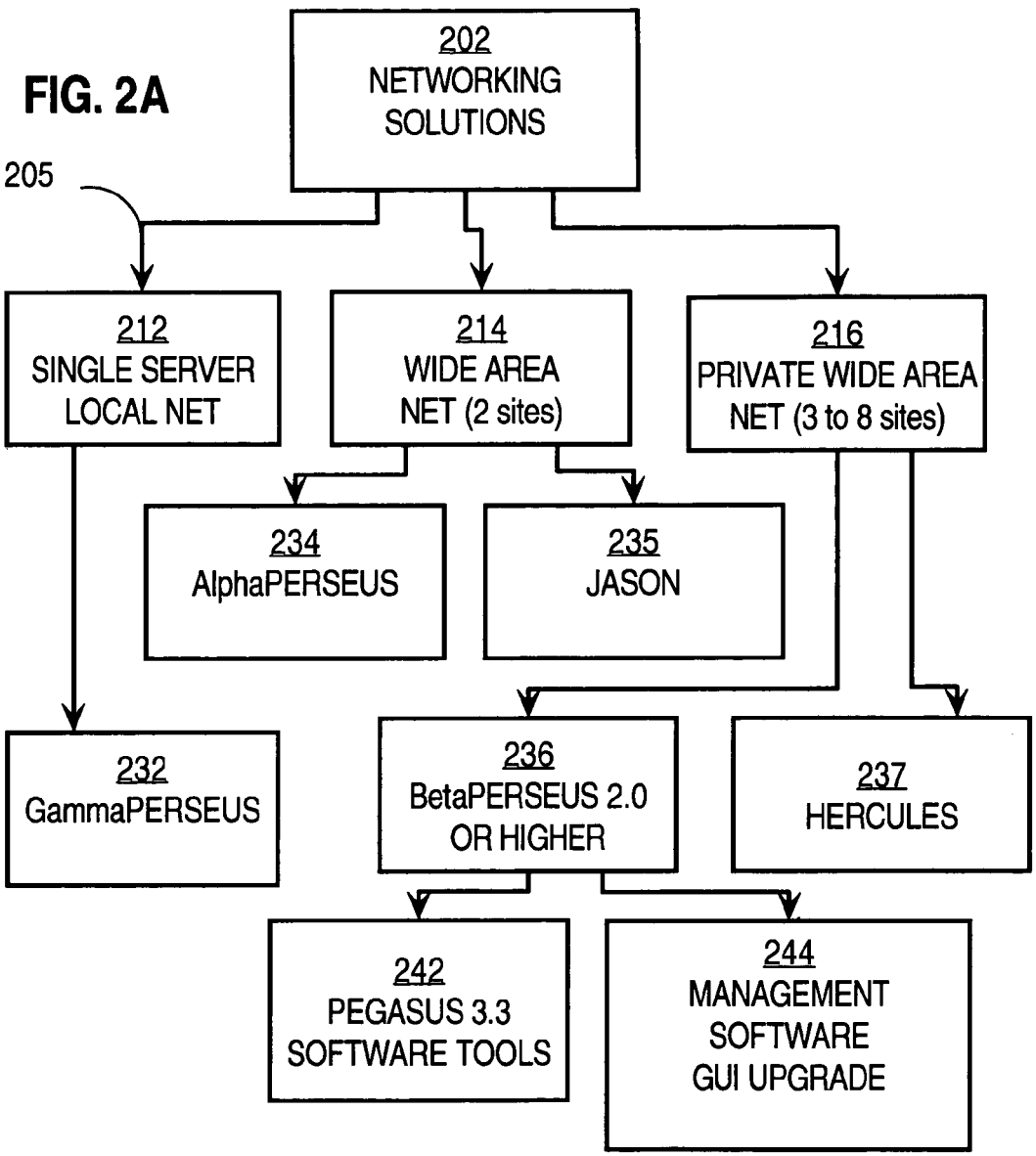
FIG. 2A is a block diagram that illustrates a networking solutions hierarchy including one or more concepts from the product type hierarchy of FIG. 1 according to one embodiment.

A method and apparatus for retrieving business data using alternative names are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1.0 Business Vocablary Data Processing

Business vocabulary terms are used to name products, product lines, technologies, information types, people, processes, development efforts and other business activities of an enterprise. Some of the vocabulary terms are used only internally and some are used for interaction with the public to establish brand name recognition or to support precise communication of customer interests and orders. Terms related in meaning or form are used to associate related business products and activities in the minds of the users of those terms. For example, a device sold by an enterprise might be named Perseus, after a hero of Greek mythology, and a software program for executing on that device might be named Pegasus, after the winged horse Perseus rode. Similarly, different models of the Perseus device might be called AlphaPerseus and BetaPerseus, to show they are part of the same product line, while different versions of each model may be numbered, such as BetaPerseus 2.0 and BetaPerseus 2.4.

The present invention is based in part on a recognition that the business terms of an enterprise constitute an important type of business data that should be included in the automated data processing that the enterprise performs, including communicating to other companies and entities. This vocabulary data about the products, services and activities of a business is a form of metadata for the products, services and activities of the enterprise. Those terms can be used to categorize the products, services and activities and to retrieve other data about those products, services and activities. The data structures employed to store, retrieve and process this metadata should account for the associations in meaning and form and support rapid associative or inferential search and retrieval, and content distribution services.

2.0 Vocabulary Development Framework

According to an embodiment, the various terms that constitute the business vocabulary of an enterprise are modeled as nodes in a hierarchy called the MetaData Framework (MDF) or the Vocabulary Development Framework (VDF). In this framework, any business term that is derived from another particular business term is positioned in the hierarchy at a node that branches from the node of that particular business term from which it is derived. When the hierarchy is embodied in stored data with appropriate data structures and software programs, it is extremely useful in naming products, services or activities and associating products with product lines.

For example, FIG. 1 shows a hypothetical product type hierarchy for a hypothetical enterprise that manufactures and sells network devices. In this hierarchy, node 102 is a root node representing network device products sold by the enterprise. Node 102 has three child nodes, 112, 114, 116 that are connected by arrows 105. The parent/child relationship is denoted by an arrow pointing from parent to child in FIG. 1. A relationship statement can be obtained reading from arrow head to arrow tail by the words "is a child of" or read in the opposite direction by the words "is a parent of." Thus node 112 is a child of node 102. Node 102 is a parent of node 112. In the product type hierarchy of FIG. 1, arrow 105 represents the product type parent/child relationship.

Node 112 represents the devices named "Perseus." In this embodiment, the content of node 112 includes "Perseus." Nodes 114, 116 represent devices named "Hercules" and "Jason," respectively. FIG. 1 shows that the Perseus device comes in three models, "AlphaPerseus," "BetaPerseus" and "GammaPerseus," represented by the three nodes 122, 124, 126, respectively. The BetaPerseus model has evolved over time through versions 1.0, 2.0 and 3.0, represented by nodes 132, 142, 154, respectively. The contents of these nodes hold the names "BetaPerseus 1.0," BetaPerseus 2.0," and "BetaPerseus 3.0," respectively. BetaPerseus 2.0 also experienced some evolutions called "BetaPerseus 2.4" and "SuperPerseus," which are represented by nodes 152, 162, respectively.

This hierarchy consists of binary relationships; that is, each relationship requires one parent and one child. The product type relationships of FIG. 1 are constrained by a rule that each child may have only one parent. There is no rule restricting the number of children a parent may have in this hierarchy. Further, there are no restrictions on how many relationships and interconnections there are between other forms of webs of concepts and concept creation.

Various applications use the information in the VDF implementation to perform different functions for the enterprise. In one application, the VDF relationships in the illustrated hierarchy are used to determine that the product named "SuperPerseus" is actually a version of the BetaPerseus model that is based on version 2.4. In another application, the VDF content is used to help provide names for products as new products are developed by automatically including the product type and model name and by preventing the re-use of an existing version number. Embodiments of this application enforce a rule that each name shall be unique. The enterprise uses the VDF with other embodiments of such an application to enforce other naming rules, such as requiring the model name shall be part of the device name. In this case the ambiguous name "SuperPerseus" is not allowed, and is discarded in favor of the automatic name, "BetaPerseus 2.5", or some allowed variation of that, which is stored as the content of node 162.

The enterprise uses the VDF with other embodiments of such an application to allow retrieval of data using alternate terms, such as allowing a user to retrieve information about the BetaPerseus 2.5 using a request that specifies either the term "BetaPerseus 2.5" or the synonym "SuperPerseus" or the acronym "BP2.5," as described in more detail below.

The vocabulary data framework (VDF) captures simultaneous multiple relationships among names, products, solutions, services, documentation and activities for an enterprise. In particular, the VDF allows other relationships to be established between nodes simultaneously with the product type relationship. Furthermore, the VDF allows any of these new relationships to involve more than the two nodes of the binary parent-child relationship already described. For example, it allows a trinary relationship among a father node, a mother node, and a child node. In general, the VDF allows N-ary relationships among nodes, where N is any integer equal to or greater than one and specifies the number of participants in the relationship.

In the more general realm of the VDF, the enterprise is considered a data domain that includes many atomic concepts that may be related. Atomic concepts include any data item involved in the enterprise that is not subdivided into separately referenced storage units. These atomic concepts include the business vocabulary for the enterprise data that is the subject of the present invention. Concepts include names, as in the above example, but also comprise paragraphs, chapters, documents, images, multimedia files, database records, database queries, network resources, citations, network addresses, code and languages (e.g., functions in Java, C++, PERL, etc.), devices, interfaces, components, and programmatic elements in XML or other constructs, among other things. The enterprise entities described by the concepts include products, as in the above example, but also include services, solutions marketed by the enterprise that employ the products and services of the enterprise, and other activities of the enterprise. The concepts and relationships are captured in conceptual graphs which are organized primarily by a partial-order relationship, commonly known as a type hierarchy. The concepts are nodes in the graph and the relationships are connections between two or more nodes. Both concepts and relationships have enumerated characteristics in some embodiments.

The graph of FIG. 1 is an example of a conceptual graph ordered by its product type hierarchy of binary (parent-child) relationships. Whereas this is one example based on a product type hierarchy, the VDF allows for simultaneous and inter-related multiple type hierarchies, as is explained in more detail in the following sections.

2.1 Multiple Hierarchies

As seen above in FIG. 1, some concepts are related in a graph depicting product types. All the concepts in this graph are associated with one category of information in the enterprise data. That category is device product types, and that hierarchy relates concepts for products that are related in development history, structure or function. However, enterprise data may include other categories or relationships. In general, multiple categories encompass the enterprise data.

For example, some of the enterprise data for an enterprise that manufactures and sells network devices are related to equipment solutions for common networking problems encountered by customers of the enterprise. Products of the enterprise that are unrelated by the hierarchy of FIG. 1 nevertheless may be useful to solve the same kind of customer problem. Thus, such products relate to the same solution. To reflect these relationships, enterprise data also are placed in a category called networking solutions in one embodiment, and are organized in a solutions hierarchy that exists concurrently with the product type hierarchy.

FIG. 2A depicts an example hierarchy of concepts in a networking solutions category. In this example, three solutions expressed by the concepts "single server local net," "wide area net (2 sites)" and "private wide area net (3 to 8 sites)" are stored in the content of nodes 212, 214, 216, respectively. All three nodes are children of the root node 202 having content "networking solutions" for this category of concepts. In the solutions type hierarchy of FIG. 2A, arrow 205 represents a networking solutions parent/child relationship. All the relationships represented by arrows in FIG. 2A are of this type. This relationship type differs from the product type parent/child relationship represented by arrow 105 of FIG. 1. Both relationship types are parent/child binary relationships, but they relate concepts in different categories.

As shown in the example of FIG. 2A, the product GammaPerseus, at node 232, is part of the equipment solution for single server local networks of node 212. Both AlphaPerseus, at node 234 and Jason at node 235 are part of the equipment solution for wide area networks connecting two sites, at node 214. BetaPerseus 2.0, at node 236, and Hercules, at node 237, are part of the equipment solution for private wide area networks connecting three to eight sites represented by node 216. Nodes 242 and 244 represent software products Pegasus 3.3 and a graphical user interface (GUI) upgrade that are installed on the BetaPerseus 2.0 device in addition to the default software that comes with that device.

The concepts at nodes 202, 212, 214, 216 may be placed in a category called networking solutions. The concepts 232, 234, 235, 236, 237 have already been placed in a category called enterprise device products; but they may also be placed in the category networking solutions. The concepts at nodes 242, 244 may be placed in a category called software products and also in the networking solutions category. FIG. 2A demonstrates that hierarchies of concepts in categories of enterprise data may be defined in addition to the hierarchy of concepts in the product type category, and demonstrates that categories may overlap.

Alternatively, non-overlapping categories are used in other embodiments. In such an embodiment, the relationship represented by arrow 205 is expressed as a relationship of a sub-component to a component of a networking solution, in which the sub-component may be a different category than the component. Rules can be expressed for the relationship. One possible rule is: software can be a sub-component of hardware, but not the other way around. Similarly, a product can be a sub-component of a networking solution category but not the other way around.

2.2 Non-Binary Relationships

Figure 2B:
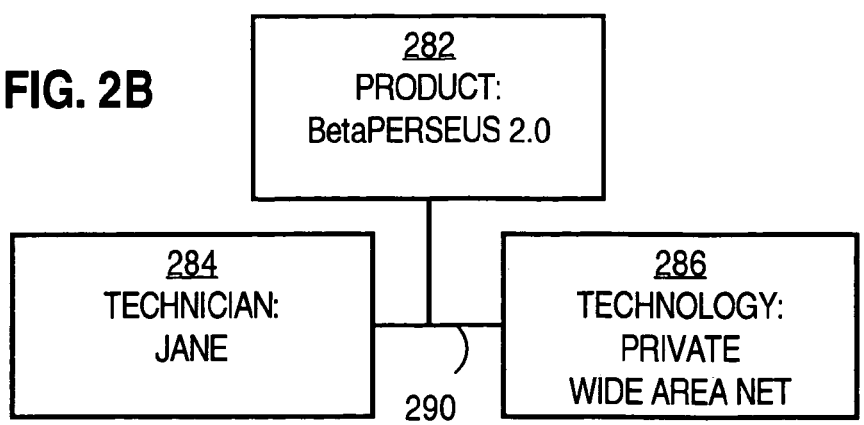
FIG. 2B is a block diagram that illustrates a non-binary relationship among concepts according to one embodiment.

FIG. 2B depicts a conceptual graph of an example non-binary relationship. This ternary relationship (also called a 3-ary relationship or three participant relationship) is useful for capturing the expertise of a person in the use of a product in a technology area. In this example, this relationship is used to state whether the expertise of a technician in the use of a product device within a technology area is of a quality that can assume values of "unknown," "poor," "average", "good," or "excellent."

The characteristics of the relationship type describe the number of participants and their category or categories. In this example the relationship type includes characteristics that indicate there are three participants, one from the user category, one from the technology category and one from the product device category. In addition, the characteristics of this relationship include at least one relationship value for storing the quality of expertise (unknown, poor, average, good, excellent). This allows the system to generalize according to a graduated scale (e.g., a 5-point scale) and call things different names and support different ways of presenting the things to the user. More details on defining and storing concepts and relationships are given in a later section.

The conceptual graph of this relationship in FIG. 2B shows three nodes 282, 284, 286 representing the three concepts, e.g., product BetaPerseus 2.0, technology private wide area network, and technician Jane, respectively. The three nodes are connected by a three-way, non-directional link 290. The link 290 includes an attribute named "quality" that takes on a value such as "good," indicating that Jane's expertise is good for using BetaPerseus 2.0 in private, wide area networks.

2.3 Documentation Category

Another category of concepts that is extremely useful to an enterprise, for both internal and external users, is documentation concepts, which encapsulate elements of electronic or tangible documents. Concepts within a documentation category include headings, sections, paragraphs, drawings, Web services, applications, algorithms, and images, among others. Documentation concepts also express the type of content in terms of what it says; for example, documentation concepts include but are not limited to "Introduction," "Features & Benefits," "Product Photo," etc. Documentation concepts may be organized in a hierarchy that facilitates automatically generating accurate, complete, up-to-date visual or printed documentation pertaining to a particular product or service. For example, a concept referring to a device, like the hypothetical Beta Perseus 2.0, can be linked by a relationship to a document concept describing the device. As another example, a device concept, like the Beta Perseus 2.0, can be linked by a relationship to a section concept in a document hierarchy for a document describing the networking solutions of which the device is a component. More examples of document categories of concepts are given in a later section.

2.4 Multiple Inter-Related Hierarchies

As seen in the above examples, a single concept, such as the device product BetaPerseus 2.0 may appear in several separate hierarchies. According to one embodiment, information defining the concept is stored only once in the VDF and relationships are defined to all other nodes to which the concept is adjacent in all the hierarchies.

Hierarchies may be implemented using object-oriented programming techniques and database servers. One advantage of this approach is that changes to the concept can be made in only one location in the VDF and all hierarchies immediately become up-to-date and reflect the changes. Further, all information generated based upon the hierarchies, such as documentation or screen displays, automatically reflects the changes.

Another advantage is that applications that retrieve the data can navigate one of the hierarchies to a particular concept and then immediately find the other hierarchies in which that concept occupies a node. Thus, a customer who has purchased a particular device product for one networking solution can determine other solutions that use that same device. The customer follows the current solution to the product and then reviews the relationships with other networking solutions of interest to the customer that utilize the device. When a networking solution of interest is found using the device, the newly found solution can be navigated above and below the node representing the device concept in order to determine what software and other devices, if any, are components and sub-components of the new solution. Further, the customer can search by solution and identify multiple products that can satisfy the solution. The customer can then inspect each of the products, obtain its documentation, and determine which product is best suited to the customer's particular needs. In some embodiments, such information is synchronized with the customer's online profile so that it is available for later reference and can be personalized.

Figure 3:
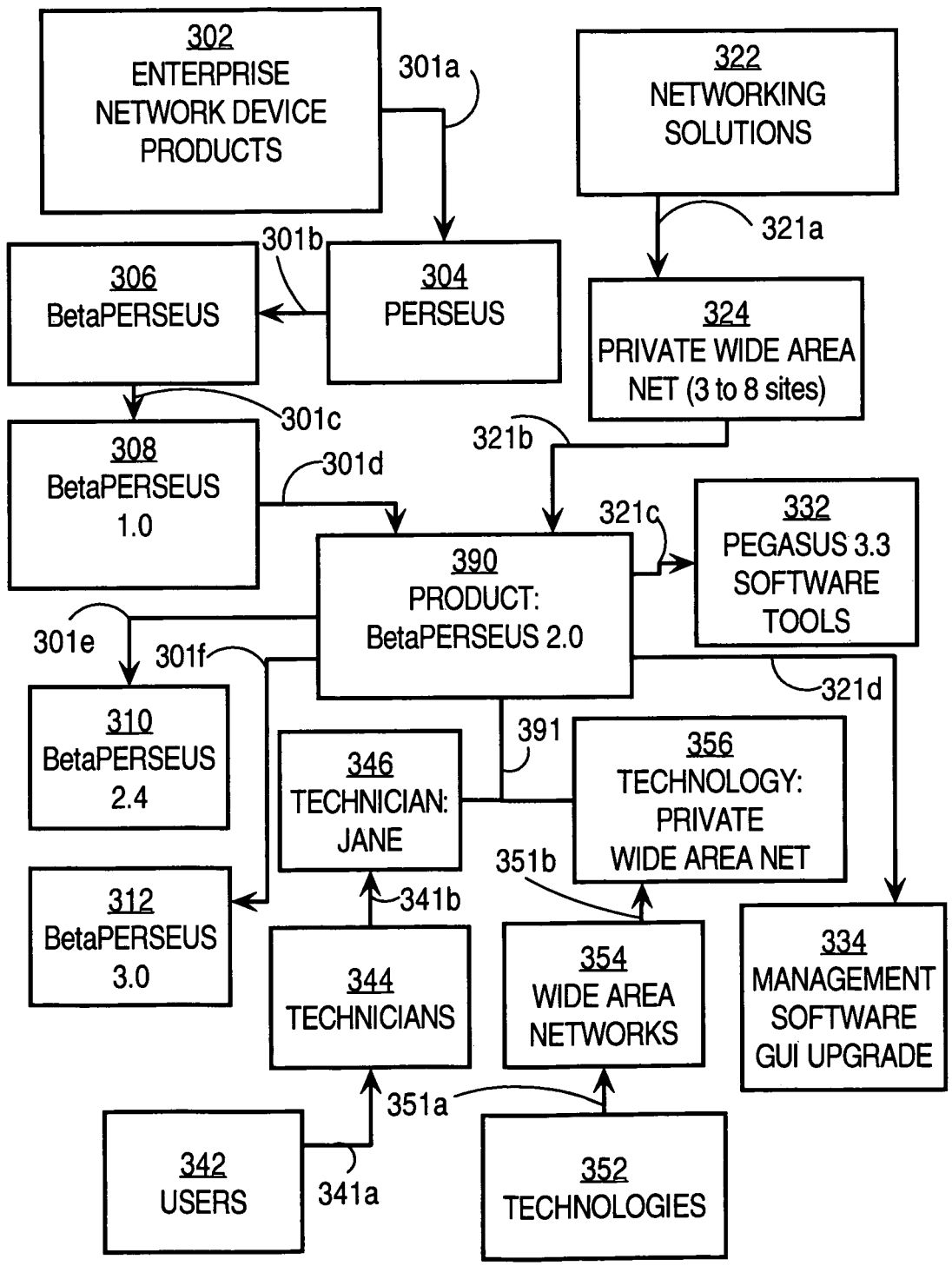
FIG. 3 is a block diagram illustrating simultaneous multiple inter-related hierarchies involving a product type concept according to one embodiment.

FIG. 3 is an example of a conceptual graph for multiple inter-related hierarchies that are associated with the device product BetaPerseus 2.0, based on the individual hierarchies and relationships of FIG. 1, FIG. 2A and FIG. 2B. The branch of the device product type hierarchy of FIG. 1 that includes the BetaPerseus 2.0 device concept appears as nodes 302, 304, 308, 390, 310 and 312 linked by the device product type, binary parent/child relationships 301. The branch of the device networking solutions hierarchy of FIG. 2A that includes the BetaPerseus 2.0 device appears as nodes 322, 324, 390, 332 and 334 linked by the networking solutions type, binary parent/child relationships 321. The 3-participant expertise relationship 391 links the node 390 for the BetaPerseus 2.0 to the concept "Jane" at node 346 and the concept "private wide area networks" at node 356. Also shown is that the concept "Jane" at node 346 is a child of the concept "technicians" at node 344 which is a child of the concept "users" at node 342. These nodes are linked by user type, binary parent/child relationships represented by arrows 341. Also shown is that the concept "private wide area networks" at node 356 is a child of the concept "wide area networks" at node 354 which is a child of the concept "technologies" at node 352. These nodes are linked by technology type, binary parent/child relationships represented by arrows 351.

The BetaPerseus 2.0 concept at node 390 is linked to the following nodes in multiple inter-related hierarchies. The BetaPerseus 2.0 concept at node 390 is a product type child of the BetaPerseus 1.0 concept at node 308, as represented by arrow 301*d*. The BetaPerseus 2.0 concept at node 390 is a product type parent of the BetaPerseus 2.4 concept at node 310, as represented by arrow 301*e*, and the BetaPerseus 3.0 concept at node 312, as represented by arrow 301*f*. The BetaPerseus 2.0 concept at node 390 is further a solutions type sub-component of the private wide area net (3 to 8 sites) concept at node 324, as represented by arrow 321*b*. The BetaPerseus 2.0 concept at node 390 has solutions type sub-components of the Pegasus 3.3 software tools concept at node 332, as represented by arrow 321*c*, and the management software GUI upgrade concept at node 334, as represented by arrow 321*d*. The BetaPerseus 2.0 concept at node 390 has two companion expertise type participants as represented by link 391; one at Jane represented by node 346 and one at private wide area networks represented by node 356. In all, the example concept at node 390 has 6 binary relationships and one ternary relationship with eight nodes in four hierarchies (product type, equipment solutions, users and technologies). Each of the concepts and relationships may be represented using stored data in a database or appropriate programmatic data structures.

Many of the other nodes in FIG. 3 may have relationships with other hierarchies in addition to the relationships shown. These other relationships are omitted so that FIG. 3 and this discussion are more clear. Multiple relationships similar to the examples listed for node 390 may be defined for these other nodes.

2.5 Root Concepts

At the top of each hierarchy for each category is a category root node representing the category root concept from which all the other concepts in the category branch. For convenience in navigating from one category to the next, each of the category root nodes is made a child of an enterprise data root node representing a top-level pseudo-concept for the enterprise data. In one embodiment, the pseudo-concept is "Vocabulary," and every node related to the Vocabulary concept by a direct "child of" relationship is a root node representing a root concept for one category.

2.6 Alternate Forms

According to an embodiment of the invention, two or more concepts may be related as alternative names for the same underlying enterprise entity, such as a product, service, or activity of the enterprise. For example both BetaPerseus 2.5 and SuperPerseus refer to the same router product. Activities of the enterprise refer to any component of activity described separately by concepts in the database besides products and services, such as administrative activities, marketing activities, research activities, joint venture activities, and documentation activities.

To reflect such relationships, each name is treated as a different concept, and the several names for the same entity are connected by relationships of a type "is an alternative name for." According to one embodiment described below, one of the concepts is designated the normative concept. The normative concept is used to relate the entity described to other entities of the enterprise, such as in the product type hierarchy. The other concepts referring to the same entity are alternative concepts. Each alternative concept is related by an "is an alternative name for" relationship to the normative concept.

Relating alternative concepts to normative concepts allows a customer to issue a "wrong" query using any of the alternative names and yet still retrieve the correct information associated with the normative concept, as described in more detail in a later section.

In addition, new alternative names are added as new concepts and are related to the normative concept by a new relationship of the alternative relationship type. In some embodiments, the new alternative names are based on user input terms if those input terms are found to apply to the normative concepts. In one embodiment, a user input term is found to apply to a particular normative concept if the user input term is a misspelling that ranks closer to a name found among the particular normative concept and the existing alternative concepts of the particular normative concept, than to any name found among other normative concepts and their alternative concepts.

2.7 Implementation of the VDF

One embodiment uses a rule-base and declarative computation approach to express the concepts, relationships and rules of the VDF. This approach may be implemented using a high level computer programming language. In one embodiment, the approach is implemented using a logical processing language such as PROLOG™. The high level logical processing language translates statements declaring types and statements expressing rules about combining types into another language, such as the C programming language, that can be compiled and run on a large variety of general-purpose computer platforms.

In this embodiment, the concepts, relationships, attributes and logical implications (including integrity constraints and general computations) are expressed as logical assertions. There are two kinds of logical assertions, facts and rules. A fact is a logical assertion that is considered unconditionally true. A rule is a logical assertion whose truth or lack of truth depends on the truth or lack thereof of other assertions. In this implementation, concepts, relationships and attributes are generally represented as facts, whereas logical implications are represented using rules.

2.7.1 Defining Concepts

For example, in one embodiment, a statement declaring that the phrase BetaPerseus 2.0 is a concept is presented in a high level logical processing language by the expression:

('BetaPerseus 2.0', is Concept)

Similar expressions are used to enter the other concepts in the vocabulary.

The concept may have several attributes besides the phrase that defines it. For example the concept may have a creation date and an author. Attributes of a concept are presented with the following expression:

('BetaPerseus 2.0', 'creation', '9/19/2000', 'author', 'John Smith')

A concept is made normative, i.e., indicated to be the official name for the underlying entity, with an expression of the form:

('BetaPerseus 2.5', isNormative)

2.7.2 Defining Relationships

The relationships connect one concept to one or more other concepts. Relationships are defined with the following expression:

(r('ConceptX', 'ConceptY', 'ConceptZ'), relationship (rID))

where r is a name for the relationship type, ConceptX, ConceptY and ConceptZ are the three concepts related by this statement, making the relationship r a ternary relationship, and this particular relationship has a unique relationship identification number rID. To ensure uniqueness, the value of rID is supplied when the relationship is defined by the system performing the logical processing. Using this expression, the "product type child of" relationship can be defined by the statement:

(product_child_of ('BetaPerseus 2.0', 'BetaPerseus 1.0'), relationship (rID2)).

According to this statement, the relationship rID2 links BetaPerseus 2.0 to BetaPerseus 1.0 by a relationship of relationship type "product_child_of."

The ternary relationship of FIG. 2B is defined, after each of the individual concepts are defined, by the expression:

(expertise('BetaPerseus 2.0', 'Jane', 'wide area networks'), relationship (rID3).

According to this statement, the relationship rID3 links the concept BetaPerseus 2.0 with the concept 'Jane' and the concept 'wide area networks' by a relationship of type "expertise."

Similarly, a marketing document stored as a Web page on a network and identified by its universal resources Locator (URL) address 'http:///www.Enterprise.com/literature/devices/catalog/Chap2/' is related to the concept 'BetaPerseus 2.0' by the expression:

(marketDoc('BetaPerseus 2.0', 'http:///www.Enterprise.com/literature/devices/catalog/Chap2/'), relationship (rID4))

The system returns a unique value for rID4, which is used to reference this particular relationship of type marketDoc in later statements.

Similarly, a relationship of the alternative type between the normative concept for "BetaPerseus 2.0" and the concept for the acronym "BP2" is established by the expression:

(alternative('BetaPerseus 2.0', 'BP2'), relationship (rIDX))

The system returns a unique value for rIDX, which is used to reference this particular relationship of type alternative in later statements.

The relationships defined above can also be given attributes according to this embodiment. Typical relationship attributes include the author of the relationship and the date the relationship is created. These attributes are set for a relationship having an unique identification of rID1 with the expressions:

(rID1, 'creator', 'John Dow')
(rID1, 'date', '10/10/2000').

Relationships may have other attributes. For example, the expertise relationship defined above has an attribute for the quality of the expertise, which, in the instance of Jane on wide area networks for the BetaPerseus2.0, is good. This attribute is expressed in this embodiment as follows:

(rID3, 'quality', 'good')

where rID3 is the unique identification for the expertise relationship among Jane, BetaPerseus 2.0 and wide area networks returned by the system when the relationship was created, as described above. For another example, the alternative relationship defined above has an attribute for the type of alternative, which can take on such values as 'synonym,' and 'acronym,' and 'Japanese,' 'Italian' etc. for different languages. In one embodiment the type may take on a value 'misspelling'; in other embodiments misspellings are included among synonyms. For the example alternative relationship, this attribute is expressed as:

(rIDX, 'type', 'acronym')

where rIDX is the unique identification for the alternative relationship between 'BetaPerseus 2.0' and 'BP2' returned by the system when the relationship was created, as described above.

A relationship can also be defined for other relationships. For example, a relationship of type "revision" is used to track changes in another relationship.

(revision (rID5, rID6), relationship (rID7))

The use of the revision relationship is illustrated in the following. If the marketing document for the BetaPerseus 2.0 is changed to a different URL, 'http:///www.Enterprise.com/Hello/Chap2/', a new relationship is formed by the statement (marketDoc('BetaPerseus 2.0', 'http:///www.Enterprise.com/Hello/Chap2/'), relationship (rID8))

To show that his new relationship with identification rID8 is just a revision of the old relationship with identification rID4 (see above), the revision relationship type is used as follows:

(revision (rID4, rID8), relationship (rID9))

Now, relationship rID9 associated with old relationship rID4 can be used to determine the new relationship rID8 that replaces the old relationship rID4.

2.7.3 Defining Rules

The hierarchies that relate concepts may have to follow certain rules. For example, as stated above, the product type hierarchy requires that a child have only one parent. These rules are enforced using logical constraints defined in a high level logical processing language as rules. A constraint that detects multiple parents in a set of expressions in the high level logical processing language of one embodiment is given by the expression:

(constraint(ConceptC, multiparent (ConceptP1, conceptP2)))
if (ConceptC, childOf, ConceptP1), (ConceptC, childOf, ConceptP2), ConceptP1~=ConceptP2.

which reads, ConceptC has multiple parents ConceptP1 and ConceptP2 if ConceptC is a child of ConceptP1 and ConceptC is a child of ConceptP2 and ConceptP1 is not equal to ConceptP2. A statement is inserted which throws an error if the multiparent constraint is detected.

Another example of a rule that is enforced in the high level logical language as a constraint is the rule that every concept must be a descendent of a root concept. As described above, a root concept is a concept that is a child of the pseudo concept "Vocabulary." A concept is a descendent of the concept Vocabulary if the concept Vocabulary is reachable from the concept by a succession of one or more "child of" relationships. If the concept Vocabulary cannot be reached from a given concept, then the given concept is an orphan concept. Orphan concepts are a violation of the rules for the product type hierarchy and generally result from errors in concept definitions or are introduced when a parent concept is deleted from the hierarchy. This constraint depends on a definition of "reachable." Reachable is defined as follows:

(reachable(ConceptX,ConceptY)) if (ConceptX, childOf, ConceptY)

(reachable(ConceptX,ConceptY)) if (reachable(ConceptX,ConceptW)), (reachable (ConceptW,ConceptY))

which reads, ConceptX reaches ConceptY either if ConceptX is a child of ConceptY or if there is a ConceptW such that ConceptX reaches ConceptW and ConceptW reaches ConceptY. The constraint is then expressed as follows:

(constraint (ConceptC, orphanConcept)) if~(reachable (ConceptC,'Vocabulary'))

which reads, ConceptC is an orphan concept if ConceptC does not reach the pseudo concept "Vocabulary." A statement is inserted which throws an error if the orphanConcept constraint is detected.

As discussed above, the example expressions presented in this section are processed by the high level logical processing system to generate code, such as C language code, that implements the concepts, relationships and constraints defined in these expressions. The C language code can then be compiled and executed on any computer system with a C compiler. Further, the C language code can be incorporated in other application programs or compiled into libraries having functions that are called from separate application programs.

3.0 Vocabulary Database

A vocabulary database provides persistent storage for the concepts, relationships, and rules of the vocabulary data framework for the enterprise data.

One embodiment uses a relational database to store the concepts and the relationships among concepts and the rules; however, any suitable data store can be used. In one specific embodiment, a cached data store is used. A relational database uses a schema to describe a series of tables each made up of one or more rows, each made up of one or more fields. The schema names the table and the fields of each row of the table. An example relational database schema to implement the VDF according to one embodiment is described below. In some embodiments the relational database includes a unique row identification number (rowID) for each row in each table.

In this embodiment, a vocabulary table includes a row for each root concept in the VDF. The fields of each row include the concept name, the concept description and the creation date, as shown in Table 1. A unique rowID may also be included in each row but is not shown in the example tables. Example root concepts are included in several rows of Table 1.

TABLE 1

The Vocabulary Table

| Root Category Name | Description | Creation Date |
|---|---|---|
| Product | Product category | Apr. 12, 2000 |
| User | User category | Apr. 12, 2000 |
| Technology | Technology Category | May 15, 2000 |
| Solution | Networking Solutions Category | Jan. 1, 2001 |

Each root concept in the vocabulary table has its own table comprising one row for every concept within the category. All concepts that are descendants of the root concept via the "child of" relationship are stored in the table defined by the root concept. Table 2 is an example Table for the Product root concept.

TABLE 2

The Product Category Table

| Name | Description | Creation Date |
|---|---|---|
| Network Device Products | Enterprise devices | Apr. 12, 2000 |
| Perseus | router product | Apr. 12, 2000 |
| Hercules | gateway product | Apr. 12, 2000 |
| Jason | hub product | Apr. 12, 2000 |
| AlphaPerseus | router product | Apr. 12, 2000 |
| BetaPerseus | router product | Jun. 16, 2000 |
| BetaPerseus 1.0 | router product | Jun. 16, 2000 |
| GammaPerseus | router product | Sep. 19, 2000 |
| BetaPerseus 2.0 | router product | Sep. 19, 2000 |
| BetaPerseus 2.4 | router product | Dec. 12, 2000 |
| BetaPerseus 3.0 | router product | Feb. 1, 2001 |
| BetaPerseus 2.5 | router product | Feb. 1, 2001 |

Several tables are employed to store relationships. These tables support N-ary relationships. The relationship type table holds one row for each relationship type, as illustrated in Table 3 for some sample relationship types described above. The table rows include fields for the name of the relationship type, as used in the high level language or conceptual graphs, a fuller description of the relationship, the number of participants and the creation date.

TABLE 3

The Relationship Types Table

| Relationship Type Name | Description | Number of Participants | Creation Date |
|---|---|---|---|
| product_child_of | product lineage | 2 | Apr. 12, 2000 |
| solution_child_of | solution lineage | 2 | Apr. 12, 2000 |
| user_child_of | user categories | 2 | Apr. 12, 2000 |
| technology_child_of | technology lineage | 2 | Apr. 12, 2000 |
| expertise | expertise of person with product in technology | 3 | Jan. 1, 2001 |
| marketDoc | Marketing document for product | 2 | Sep. 19, 2000 |
| revision | track revisions in concepts/ relationships | 2 | Feb. 1, 2001 |
| alternative | Relates an alternative concept to a normative concept | 2 | Feb. 1, 2001 |

The participant type table holds one row for each participant type in a relationship type, as illustrated in Table 4 for the example relationships of Table 3. This table has a row for each participant of each relationships type. Each row has fields for the name of the relationship type, the role of the participant in the relationship, and the participant type, which is the category of the concept that may fill the given role in the relationship type.

TABLE 4

The Participant Types Table

| Relationship Name | Role | Participant Type |
|---|---|---|
| product_child_of | child | Product |
| product_child_of | parent | Product |
| solution_child_of | child | Networking Solution/Product |
| solution_child_of | parent | Networking Solution/Product |
| user_child_of | child | User |
| user_child_of | parent | User |
| technology_child_of | child | Technology |
| technology_child_of | parent | Technology |
| expertise | person | User |
| expertise | product | Product |
| expertise | technology | Technology |
| marketDoc | product | Product |
| marketDoc | document | Document |
| revision | old version | Vocabulary/relationshipID |
| revision | new version | Vocabulary/relationshipID |
| alternative | normative | Vocabulary |
| alternative | alternative | Vocabulary |

The relationship instance table (Rinstance table) and the participant instance table (Pinstance table) have entries for every instance of the relationships as they are defined for the enterprise data. An example Rinstance table is shown in Table 5 and an example Pinstance table is shown in Table 6, for some of the relationships described above. When a particular relationship is defined between two or more concepts, a new relationship identification (rID) is generated. In one embodiment the particular relationship ID, rID, is the unique rowID corresponding to the next row in the Rinstance table.

TABLE 5

The Relationship Instance (Rinstance) Table

| rID | Relationship Type Name | Creation Date |
|---|---|---|
| 5000 | product_child_of | Sep. 19, 2000 |
| 5001 | marketDoc | Sep. 19, 2000 |
| 5002 | product_child_of | Sep. 19, 2000 |
| 5003 | expertise | Sep. 19, 2000 |
| 5004 | marketDoc | Sep. 20, 2000 |
| 5005 | revision | Sep. 20, 2000 |
| 5006 | alternative | Sep. 20, 2000 |

When a "product child of" relationship is created between the BetaPerseus 2.0 and BetaPerseus 1.0 on Sep. 19, 2000, an entry is made into a row of Table 5 and a unique rID of "5000" is generated by the system. Then two rows are added to Table 6 for the two concepts that participate in the "product child of" relationship that has just been added to Table 5. Those two rows each list in the rID field the rID value of "5000" generated for this relationship. One row is generated in Table 6 for the concept BetaPerseus 2.0 in the participant role of child for rID "5000." A second row is generated in Table 6 for the concept BetaPerseus 1.0 in the participant role of parent for rID "5000."

TABLE 6

The Participant Instance (Pinstance) Table

| RID | role | Participant |
|---|---|---|
| 5000 | child | BetaPerseus 2.0 |
| 5000 | parent | BetaPerseus 1.0 |
| 5001 | product | BetaPerseus 2.0 |
| 5001 | document | http:///www.Enterprise.com/literature/devices/catalog/Chap2/' |
| 5002 | child | BetaPerseus 2.4 |
| 5002 | parent | BetaPerseus 2.0 |
| 5003 | person | Jane |
| 5003 | product | BetaPerseus 2.0 |
| 5003 | technology | private wide area net |
| 5004 | product | BetaPerseus 2.0 |
| 5004 | document | http:///www.Enterprise.com/Hello/Chap2/ |
| 5005 | old version | 5001 |
| 5005 | new version | 5004 |
| 5005 | old version | 5001 |
| 5005 | new version | 5004 |
| 5006 | normative | BetaPerseus 2.0 |
| 5006 | alternative | BP2 |

On the same date, in this example, the new product is related to its marketing document with the marketDoc relationship that gets rID "5001." Its participants are listed in Table 6 on the two rows having rID "5001." Later that day a new product_child_of relationship is generated for BetaPerseus 2.4 and receives rID "5002." Its participants are listed in the two rows of Table 6 with rID of "5002." Then the expertise relationship of Jane using the BetaPerseus 2.0 in private wide area networking is established on the same day and gets an rID of "5003." The three participants of that relationship are added to Table 6 in the three rows with an rID value of "5003." The next day, on Sep. 20, 2000, a new marketing document is associated with the product by generating a new marketDoc relationship that receives the rID of "5004." The product and document participants are added to Table 6 in the rows showing an rID value of "5004." The revision of the marketing document is memorialized with the revision relationship, which receives an rID of "5005." The two participants of the revision relationship are added as two rows to Table 6 having an rID value of "5005" in Table 5. The two participants are the old marketDoc relationship rID of "5001" and the new marketDoc relationship rID of "5004."

Establishing the concept BP2 as an alternative for the normative concept BetaPerseus 2.0 generates an alternative relationship, which receives an rID of "5006." The two participants of the alternative relationship are added as two rows to Table 6 having an rID value of "5006" in Table 5. The two participants are the normative concept "BetaPerseus 2.0" and the alternative concept "BP2."

Though participants are listed in Table 6 with increasing values in the rID field, it is not necessary that the value of rID increase monotonically for the system to operate.

The "is a" relationship is a common relationship that also could be represented with entries in the Relationship Type, Participant Type, Relationship Instance and Participant Instance tables. However, better performance is achieved if all instances of an "is a" relationships are placed in an "Is_A" table. For one embodiment, an example Is_A table is shown in Table 7. For this example, all "product child of" relationships are kept in this Is_A table.

TABLE 7

Is_A Table.

| Concept Name | Parent Concept | Creation Date |
|---|---|---|
| Enterprise Network Device Product | Product | Apr. 12, 2000 |
| Perseus | Enterprise Network Device Product | Apr. 12, 2000 |
| AlphaPerseus | Perseus | Apr. 12, 2000 |

Attributes of concepts and relationships beyond those already included in the above tables are kept in one or more attributes tables. In one embodiment, all these additional attributes of concepts are kept in a single concepts attributes table. Similarly, all the additional attributes of relationships are kept in a single relationships attributes table. Table 8 is an example concepts attributes table for the example concepts described above.

TABLE 8

Concepts Attributes Table.

| Concept Name | Attribute Name | Attribute Value |
|---|---|---|
| BetaPerseus 2.0 | author | John Smith |

Table 9 is an example relationships attributes table for the example relationships described above. The expertise relationship was described above to include an attribute called "quality" for indicating the quality of the expertise using one of the values "unknown," "poor", "average," "good," and "excellent." This relationship type occurred in the relationship having rID of 5003 as shown above in Table 5. Therefore the corresponding entry in the relationships attributes table is given in Table 9.

TABLE 9

Relationships Attributes Table.

| rID | Attribute Name | Attribute Value |
|---|---|---|
| 5003 | quality | good |
| 5006 | alternative type | acronym |

The alternative relationship was described above to include an attribute called "alternative type" for indicating the type of alternative using one of the values "synonym," "acronym", "Japanese," "Italian," etc., and, in some embodiments "misspelling." This relationship type occurred in the relationship having rID of 5006 as shown above in Table 5. Therefore the corresponding entry in the relationships attributes table is given in Table 9.

The rules that express general computations and constraints on the relationships are also stored in tables. In this embodiment, the rules are stored as text for the high level logical processing language. In this way, the stored rules can be imported directly into a rules engine program of the high level logical processing system. Table 10 is an example rules table including the reachable rule described above.

TABLE 10

Rules Table

| Rule Name | Rule Statement Sequence Number | Rule Statement |
| --- | --- | --- |
| reachable | 1 | reachable(ConceptX, ConceptY) if (ConceptX, childOf, ConceptY) |
| reachable | 2 | reachable(ConceptX, ConceptY) if reachable(ConceptX, ConceptW), reachable(ConceptW, ConceptY) |

One embodiment of the VDF allows multiple concepts from different concept categories to have the same name. The duplicate names are converted to unique identifiers called DupIDs and the unique identifiers are used in the concept database. The duplicates table is used in the conversion process. Table 11 is an example duplicates table for an embodiment in which a product concept and a technology concept both use the name Perseus. In this case, the name inserted into the second row of Table 2 above would be "1234" instead of "Perseus."

TABLE 11

Duplicates Table

| DupID | Name | Category |
| --- | --- | --- |
| 1234 | Perseus | Product |
| 2789 | Perseus | Technology |

One embodiment of the VDF also allows raw terms to be stored in the database. Raw terms are words or phrases that may become a concept at a later time. Raw terms can originate from a wide variety of sources, such as a trade journal article reviewing a product or a customer order. The raw terms are stored in this embodiment in a dedicated table. Table 12 is an example raw term table.

TABLE 12

The Raw Terms Table

| Raw Term Name | Description | Creation Date | Category |
| --- | --- | --- | --- |
| SuperPerseus | term for BetaPerseus 2.5 coined by Reviewer A. Newman | Dec. 12, 2000 | Product |
| P-Routers | Term for Perseus routers in customer request from Company A | Sep. 25, 2000 | Product |

One embodiment of the VDF stores alternative concepts in a separate table. Only the normative concepts appear in the category tables described above. Some raw terms end up as alternative concepts. For example, "SuperPerseus" may become an alternative term for "BetaPerseus 2.5." Table 13 is an example alternative concept table.

TABLE 13

The Alternative Concepts Table

| Alternative Term Name | Description | Creation Date | Category |
| --- | --- | --- | --- |
| SuperPerseus | Synonym for BetaPerseus 2.5 | Jan. 1, 2001 | Product |
| BP2 | acronym for BetaPerseus 2.0 | Dec. 12, 2000 | Product |

4.0 Vocabulary Data Server

The Vocabulary Data Server (VDS) is one or more processes that provide management of and access to the enterprise data in the vocabulary database to other processes in an enterprise data processing system. Herein, the vocabulary database is also called the VDS Concept Database.

In the disclosed embodiment, the VDS includes several object-oriented application program interfaces (APIs). Several of the VDS APIs use function calls that are configured to allow client processes to interact with the database application without a need to know the organization of the database implementation. This allows modifications to be made to the database organization, such as adding relationships or adding or deleting levels to one or more hierarchies, without changing the client processes. All adjustments to changes in the database are accommodated in the VDS APIs.

Figure 4:
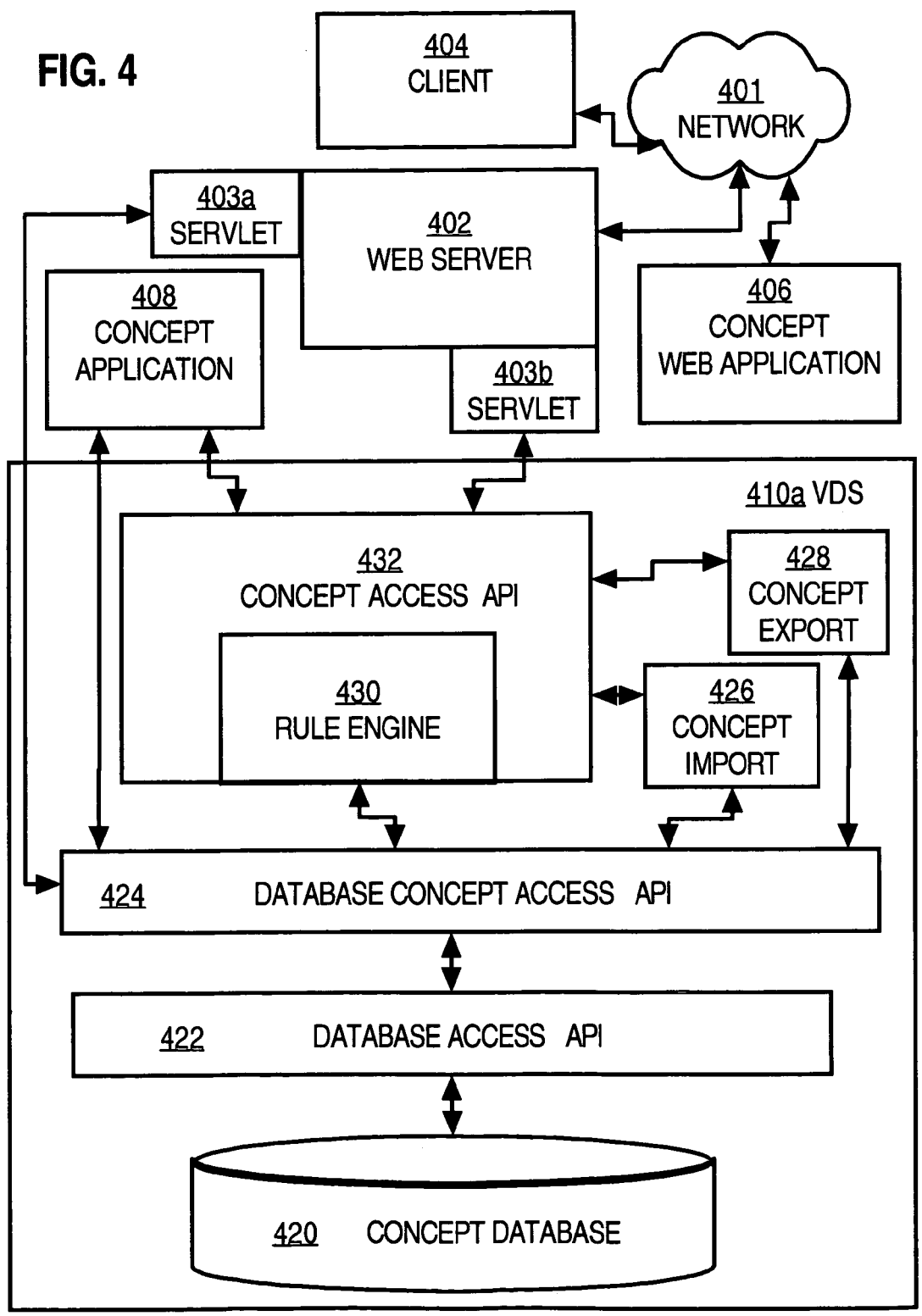
FIG. 4 is a block diagram illustrating a vocabulary data server and external applications according to one embodiment.

FIG. 4 is a block diagram showing the architecture of the VDS 410 and its relationship to some external processes. The VDS Concept database 420 is described above. A database access API 422 provides processes to operate on the database rows and tables based on knowledge of the database schema. These processes include connecting to the database, starting a transaction, such as adding, deleting or modifying a row in a table, committing the change in the row to the persistent storage, aborting a transaction, and disconnecting from the database. The database access API 422 also provides processes for adding, deleting, and modifying a raw term in the raw term table and an alternative term in the alternative term table.

A database concept access API 424 provides processes for manipulating concepts, relationships and rules in the concept database without requiring knowledge of the actual database schema. For example, processes are included to return all the concepts in a given category, to generate and store a concept category, to add a concept to a category, to return sub-concepts (that is, concepts that are descendent of a given concept), to return child concepts, to return the parent concept of a given concept, to return ancestor concepts, to rename a given concept, to set the parent of a given concept, to delete a concept, and to return duplicate mapping. For example, processes are included to return all the alternative concepts for a given concept, or the normative concept for a given alternative concept. The database concept access API 424 also includes processes for manipulating relationships, such as to return all relationships, to return all relationship types, to return all "Is_A" relationships, to return all relationships of a given type, to generate and store a relationship type, to generate and store a relationship, to modify a participant or participant type in a relationship type, to modify a participant instance in a relationship instance and to delete a relationship. The database concept access API 424 includes processes for manipulating attributes, such as to return attribute information for all concepts in a given category or all alternative concepts of a given normative concept, to set attribute information, to update attribute information, and to delete attribute information. The database concept access API 424 includes processes for manipulating rules, such as to return all rules in the rule table, to return all rules with a given name, to set the definition of a rule with a given name and sequence number, to generate and store a new rule with a given name and definition, to delete a given rule, and to delete rules with a given name.

The VDS database concept access API 424 is used by applications that are external to the VDS 410, such as concept application 408, and servlet 403a of Web Server 402. The VDS database concept access API 424 is also used by other processes within VDS 410, such as the concept import module 426 and the concept export module 428, and the rule engine 430 of the concept access API 432. All elements of FIG. 4 that are shown outside of VDS 410 are shown by way of example, and are not required. Further, the structural elements of VDS 410 are shown as examples and the specific architecture shown is not required.

The concept import module 426 is designed for the bulk import of a large amount of data, splitting that data into concepts, and storing the concepts in the concept database 420. The concept export module 428 is designed for the bulk export of a large number of related concepts and concept attributes to an external system, such as concept application 408, and client 404 or concept web application 406 through the web server 402 via servlet 403b.

The concept access API 432 provides processes for use by other applications that deal with groups of related concepts, or for responding to queries about concepts, relationships and rules that are received from external application programs. The API is used, for example, by the concept application 408 and servlet 403b of Web server 402 which are technically client processes of the VDS. Through network 401 and the Web server 402, a standalone client 404 such as a Web browser or a concept Web application 406 obtains and uses concept data. These are technically client processes of the Web server 402.

The concept access API 432 groups related concepts based on the requests made by the client processes. The concept definitions and relationships are checked to determine that constraints are not violated. Rules that are employed to define the computations or constraints employed by the concepts and relationships are obtained from the concept database 420 through the database concept access API 424, are converted to executable statements, and are executed by the rule engine 430 of the concept access API 432.

In one embodiment, the rule engine 430 is integrated with the concept access API 432 through the use of a foreign function facility of the PROLOG™ rule engine. This component provides service functions that enable the rule engine to access information, including rules expressed in text of a high level language, from the concept database 420 through the database concept access API 424. Rule execution functions can execute in the rule engine 430 the rules retrieved from the database 420. These functions marshal the function arguments (such as concepts/relationships/attribute) into the rule arguments, execute the PROLOG™ rule and retrieve any results, and un-marshal the rule results into a results set suitable for returning back to the client process, e.g., the calling application.

In this arrangement the concept database can be continually updated with new concepts, new hierarchies, new levels in old hierarchies, new relationships between hierarchies, and new rules, without requiring changes in the applications such as concept application 408, Web server 402, standalone client 404, or concept Web application 406. Any changes dictated by changes in the database 420 can be accommodated by changes in one or more of the APIs of the VDS, such as database access API 422, database concept access API, and concept access API 432.

5.0 Method of Processing Enterprise Data

Figure 5A:
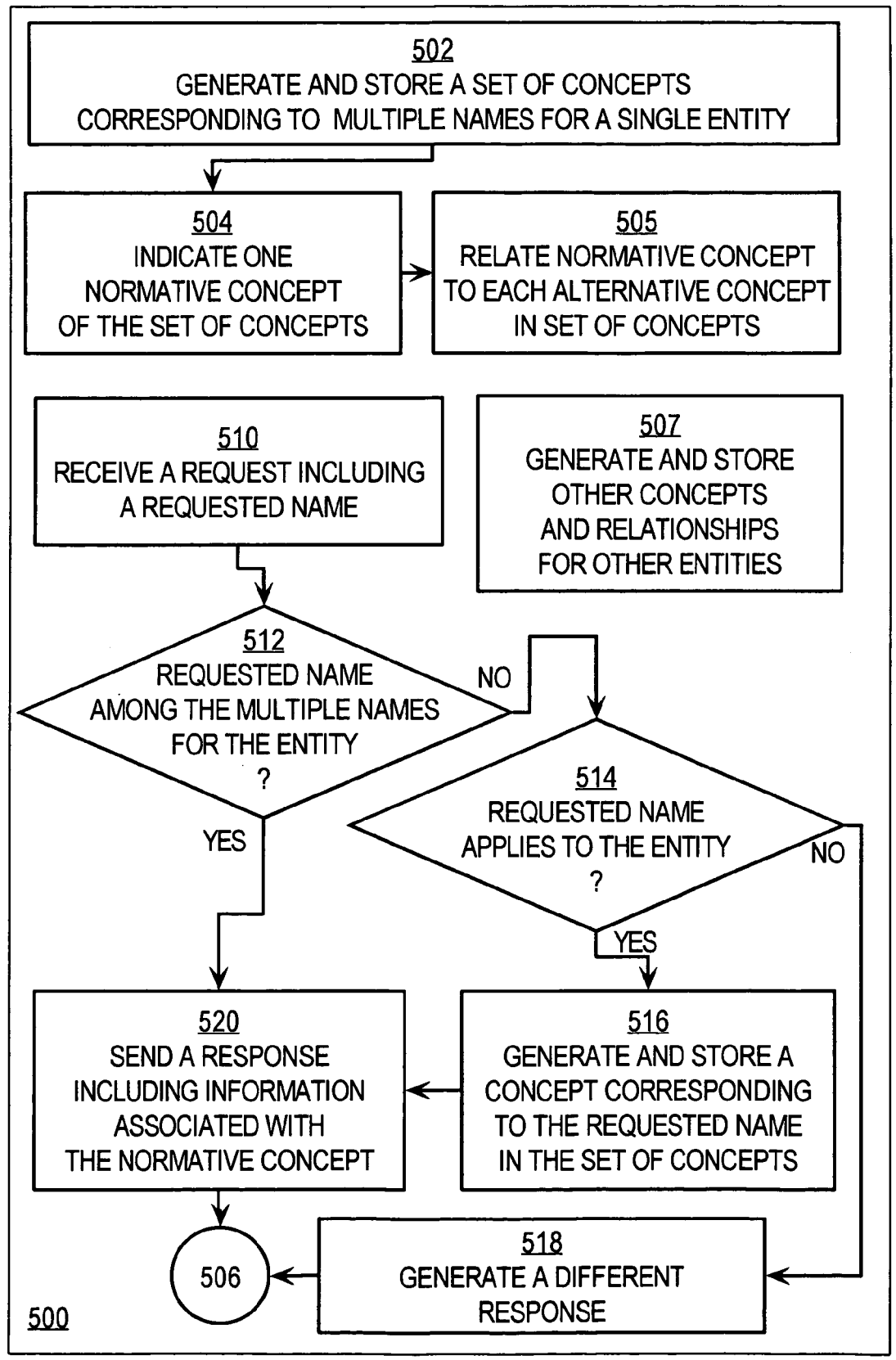
FIG. 5A is a flow chart illustrating a method for processing enterprise data according to one embodiment.

FIG. 5A is a flow chart depicting a method 500 for responding to requests for data about an enterprise according to one embodiment.

In step 502 a set of concepts corresponding to multiple names for a single entity are generated and stored. For example, concepts are generated and stored corresponding to the names "BetaPerseus 2.5" "SuperPerseus" "BP2.5" for the same network device model. The multiple names may be input manually by a system administrator or subject matter expert, or automatically obtained from a raw terms table or parsed from data received over the network.

In one embodiment, the names are first parsed from data received over the network and placed in the raw terms table, and then associated with a particular entity. The concepts pertaining to the multiple names for the single entity are generated and stored in the database. For example, zero, some or all of the concepts are stored in a table for a particular category, such as the product type category, and the rest are stored in the alternative concepts table. In the example embodiment, all three concepts "BetaPerseus 2.5," "SuperPerseus" and "BP2.5" are placed in the alternative concepts table.

In step 504, one of the concepts associated with the single entity is indicated as the normative concept for that entity. For example, the normative concept is moved to or left in the table for a particular category, and the rest are moved to or left in the alternative concepts table. In some embodiments, the first concept generated for the entity is indicated as the normative concept. In other embodiments, other objective means are used to determine the normative concept. For example, the concept having a name with the fewest characters is selected as the normative concept. In the example embodiment, the concept named "BetaPerseus 2.5" is moved from the alternative concepts table to the product type category table and the concepts named "SuperPerseus" and "BP2.5" are left in the alternative concepts table. Alternatively, different rules of selecting a normative concept may be provided. The normative name of a concept is different for each category root. Thus each category root may have a different normative concept, which may be specified, for example, by an industry standard, or a shared vocabulary.

In step 505, alternative type relationships are generated between the normative concept and the alternative concepts and stored, using an algorithmic process or a hand process, as described below with respect to FIG. 5B.

In step 507, other concepts and relationships for other entities are generated and stored as described above, and again below with reference to FIG. 5C. This step may occur before, during or after steps 502, 504, 505. In the example embodiment, described below with reference to FIG. 5C, a concept is generated containing the URL address "http://www.Enterprise.com/pict1234.jpg/" of an image of the BetaPerseus 2.5 router; and a relationship (rID=5050) associates the concept for the URL address with the concept for "BetaPerseus 2.5." These concepts and relationships are established before, during or after the concepts "SuperPerseus" and "BP2.5" are placed in the alternative concepts table.

In step 510, a request is received for information about the enterprise. For example, the request is received from a client process, such as a browser, executing on another machine on the network. For another example, a request is received from another process executing on the vocabulary data server (VDS) with the concept database. The request includes a requested name for an entity. For example, the request includes the requested name "SuperPerseus." The request is used by a customer, for example, to request more information from an enterprise web site about a product the customer knows only by the name "SuperPerseus."

In step 512, it is determined whether the requested name is found among the multiple names for any entity. For example, the requested name "SuperPerseus" is compared to the names in the normative concepts that constitute the product hierarchy and not found; but is found among the names in the alternative concepts table in the database, as shown above in Table 13. In this example the requested name is found among the alternative names; and therefore the requested name is an alternative name for some entity of the enterprise.

If the requested name is found among the normative or alternative concepts, control passes to step 520 to send a response including information associated with the normative concept for the entity. For example the image identified by its URL "http:///www.Enterprise.com/pict1234.jpg/" that is associated with the normative concept during step 507 described above is included in a response. Step 520 is described in more detail below for one embodiment with reference to FIG. 5D.

The system's response to the request continues or terminates as indicated by step 506.

If the requested name is not among the concepts in a hierarchy or the alternative concepts tables, control passes to step 514. In step 514 it is determined whether the requested name applies to an entity that has a normative concept. For example, a subject matter expert reviews the requested name and determines whether the term applies to a particular entity having a different name in a normative concept. In another example, a spelling correction algorithm is applied to determine that the requested name is spelled most like a particular term in a normative concept or alternative concept for a particular entity. The requested term is then determined to apply to the particular entity.

Control passes from step 514 to step 516 to generate and store an alternative concept corresponding to the requested name. For example, a new concept is generated for the requested name and stored in the alternative concepts table; and a new relationship of the alternative relationship type is generated and stored in the relationships table, making the new concept an alternative for the normative concept for the particular entity. Control then passes to step 520 to send a response including information associated with the normative concept.

In some embodiments, steps 514 and 516 are omitted; no attempt is made to form an alternative concept from a new term in response to a request. In some embodiments, requested terms that are new terms are simply placed in a raw terms table, such as Table 12 above. In step 502 a human analyst reviews terms in the raw terms table and determines whether one or more of the raw terms become alternative concepts of normative concepts in one or more of the hierarchies.

If the requested name does not apply to a particular entity, or if steps 514 and 516 are omitted, control passes to step 518 to generate a different response. For example, in one embodiment the response includes a dialog box prompting a user to employ a different term in a subsequent request. In another embodiment, the response includes an index of topics for requests that are supported by the database. In some embodiments, the index is presented with a focus on a term closest in spelling to the requested term. In some embodiments, the response includes returning a web page presented when the original request was made.

Figure 5B:
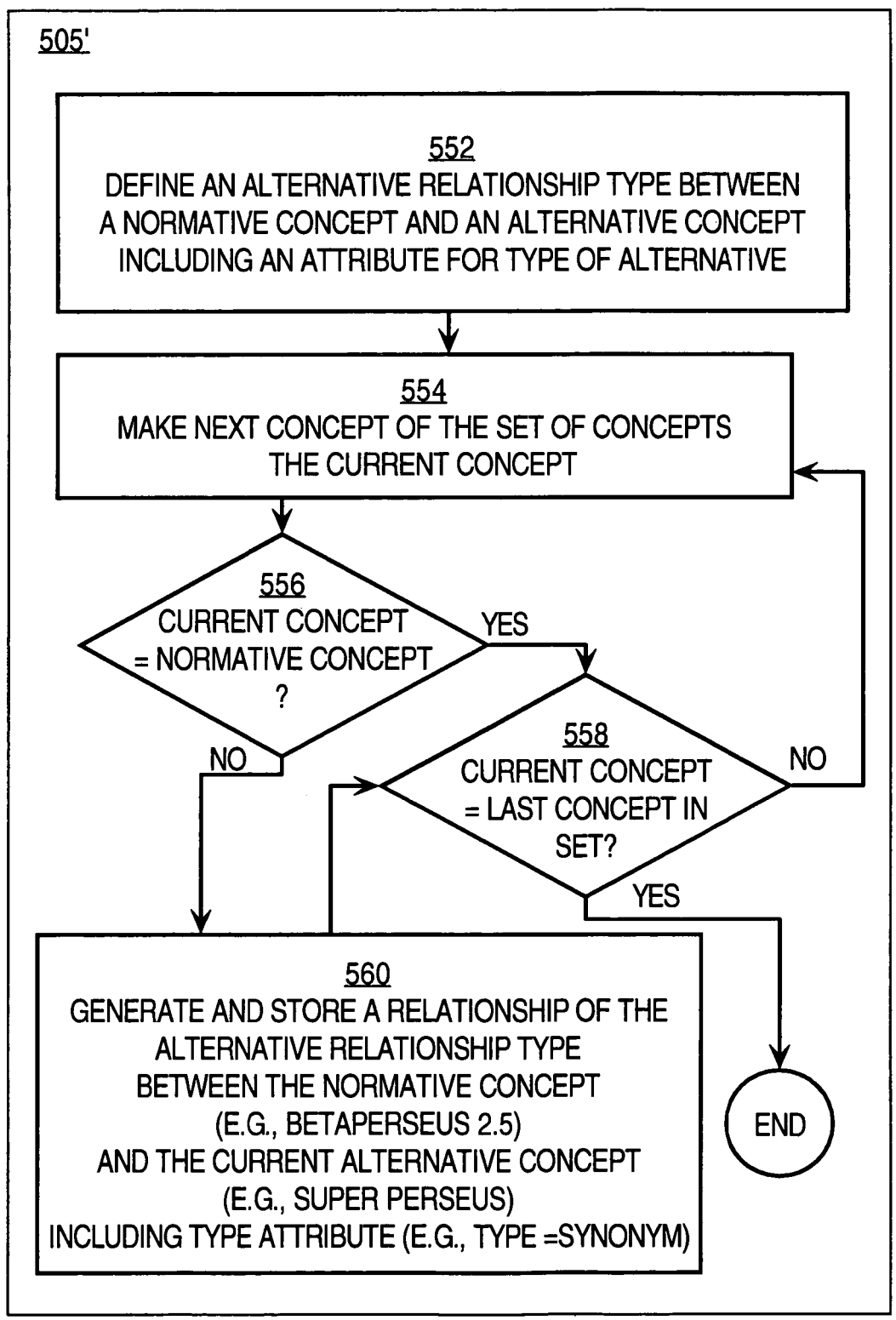
FIGS. 5B, 5C and 5D are flow charts illustrating further details about steps depicted in FIG. 5A in other embodiments.

FIG. 5B is a flow chart depicting an embodiment 505' of step 505 for relating alternative concepts to a normative concept depicted in FIG. 5A.

In step 552 a relationship type is defined for relating an alternative concept to a normative concept. In this embodiment, the relationship type includes an attribute for the type of the alternative. Example valid values for the attribute include "synonym", "misspelling", "acronym", "Italian language", and "Japanese language."

In step 554, the next concept in the set of concepts for a particular entity is made the current concept. When first executed, step 554 makes the first concept in the set the current concept.

In step 556, it is determined whether the current concept is the normative concept. If so, a relationship is not formed with the normative concept and control passes to step 558.

In step 558, it is determined whether the current concept is the last concept. If so, all the concepts in the set have been related to the normative concept, and the process ends. If not, control passes back to step 554 to make the next concept the current concept.

If, in step 556, it is determined that the current concept is not the normative concept, then control passes to step 560 to form a new relationship of the alternative relationship type. The relationship is a new instance of the alternative relationship type, having a rID, and includes two participants, a normative concept and an alternative concept, and a alternative type attribute.

For example, relationship with rID of 5555 is formed having normative concept holding the name "BetaPerseus 2.5" and alternative concept holding the name "SuperPerseus" having a type attribute value of "synonym." For another example, relationship with rID of 5556 is formed having normative concept holding the name "BetaPerseus 2.5" and alternative concept holding the name "BataPerseus2.5" having a type attribute value of "synonym" or "misspelling." Control then passes to step 558, described above.

Figure 5C:
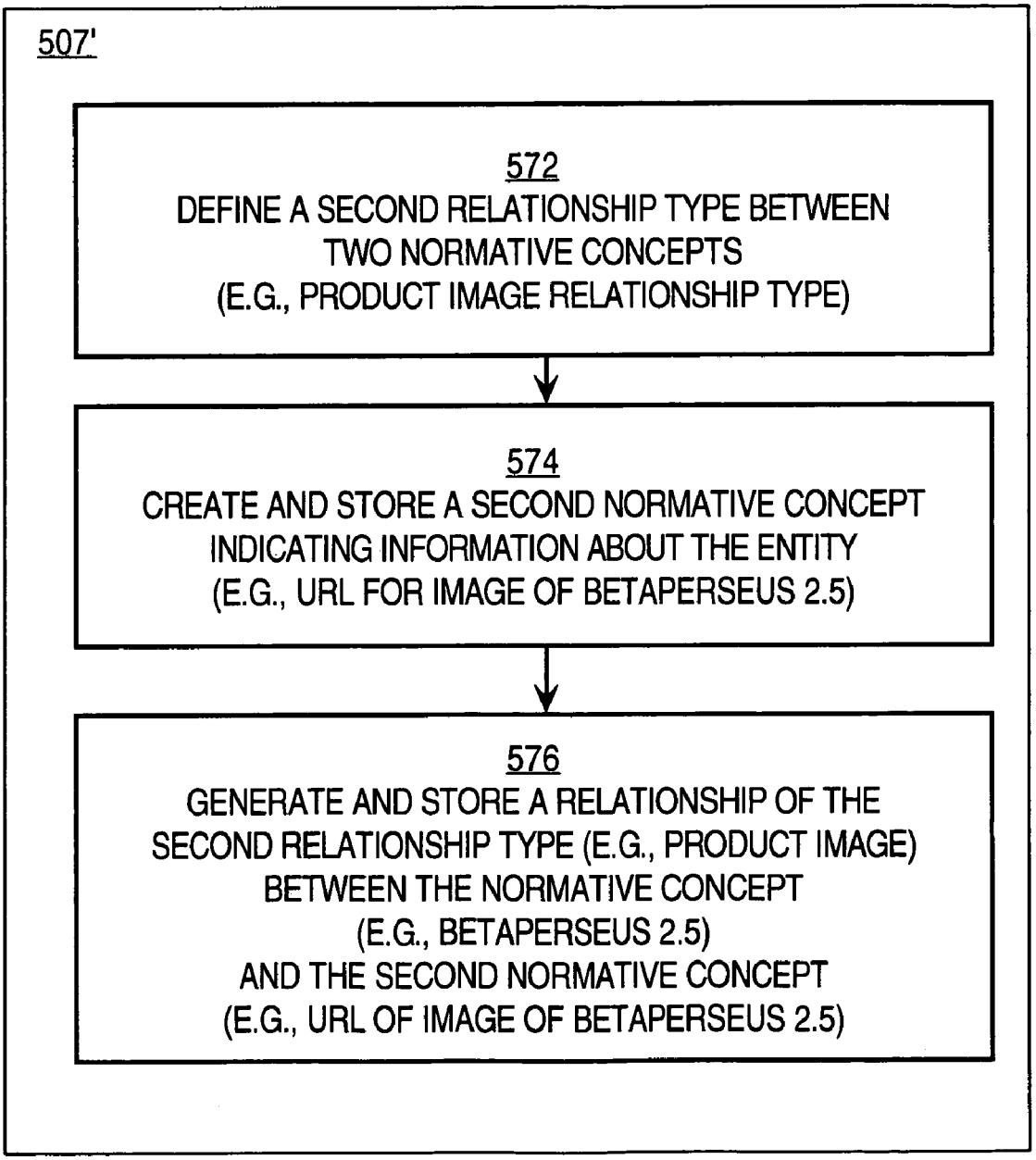

FIG. 5C is a flow chart depicting an embodiment 507' of step 507 for generating other concepts and relationships depicted in FIG. 5A.

In step 572 a different relationship type is defined for relating two normative concepts. For example a product image relationship type is defined between a normative concept in the product hierarchy and a normative concept in the documentation category product image. One of the normative concepts includes information associated with the other normative concept by virtue of the relationship.

In step 574 a different normative concept is generated and stored in the concept database. For example, a concept is generated containing the URL address "http:///www.Enterprise.com/pict1234.jpg/" of an image of the BetaPerseus 2.5 router.

In step 576 a new relationship of the different relationship type is formed. For example, relationship with rID of 5050 of the product image relationship type is formed having a first normative concept holding the name "BetaPerseus 2.5" and a second normative concept holding the URL address of the image for the BetaPerseus 2.5 router. By virtue of relationship 5050, the URL address of the image, and the image at that address, are associated with the normative concept having the name "BetaPerseus 2.5."

Figure 5D:
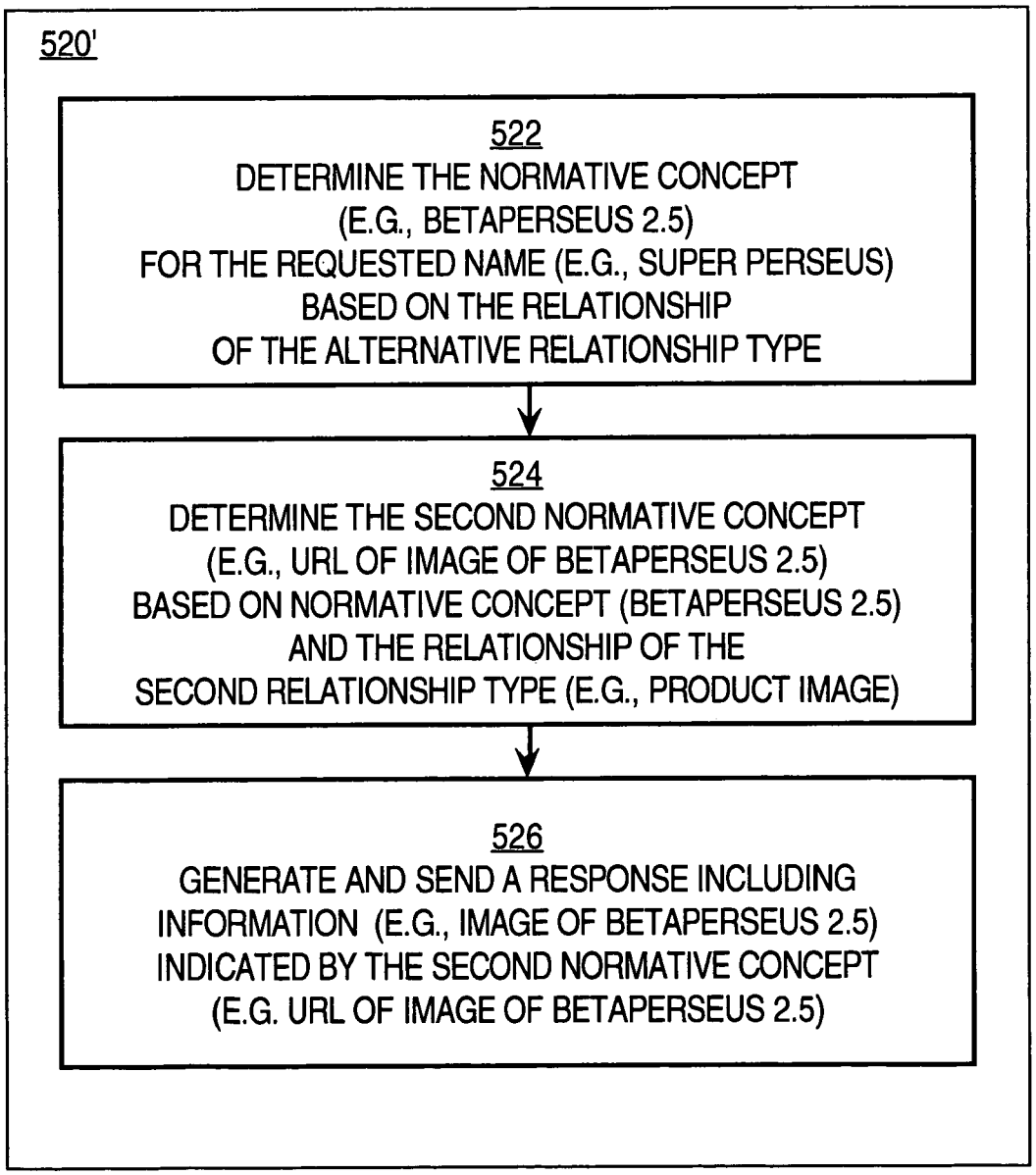

FIG. 5D is a flow chart depicting an embodiment 520' of step 520 for sending a response including information associated with a normative concept depicted in FIG. 5A. When control passes from step 512, the requested name is found in a particular concept among the normative and alternative concepts.

In step 522, the normative concept for the particular concept is determined. If the particular concept is a normative concept, no further steps are required. If the particular concept is an alternative concept, the relationships are used to find the normative concept related to the particular concept by the alternative relationship type.

For example, the concept access API (432 in FIG. 4) is used to find the rID of the relationship that is an "alternative" relationship type and that has the particular concept as a participant. The rID is used to find the normative concept that is the other participant. For example, if the particular concept includes the name "SuperPerseus," then the concept access API is used to find the relationship identified by rID 5555 that includes the particular concept as a participant of an "alternative" relationship type. The relationship having rID 5555 is used to determine that the alternative concept "SuperPerseus" has the normative concept "BetaPerseus 2.5," hereinafter called the first normative concept.

In step 524, a second normative concept related to the first normative concept by a second relationship is determined. For example, the concept API is used to determine that the first normative concept for BetaPerseus 2.5 is a product participant in a product image relationship type having rID 5050. The relationship with rID of 5050 is used to determine that the image for the BetaPerseus 2.5 is given by the concept having the URL for the image file.

In step 526, a response is generated including information associated with the first normative concept by the second relationship. For example a web page is generated including the image given by the URL of the second concept based on its association with the first concept by the product image relationship type.

As a result of the steps given in embodiment 520', a request including the alternative name "SuperPerseus" causes a response to be generated with the product image associated with the normative concept "BetaPerseus 2.5."

These techniques employ alternative concepts related to a first, official or "normative" concept for each entity associated with the enterprise. Relating alternative concepts to normative concepts allows a customer to issue a "wrong" query using any of the alternative terms and yet still retrieve the correct information associated with the normative term. These techniques also allow relationships between entities of the enterprise to be comprehensively described with relationships among normative concepts alone—fewer than the number of relationships that would be involved if relationships were formed among many alternative terms for each pair of the related entities.

6.0 Hardware Overview

Figure 6:
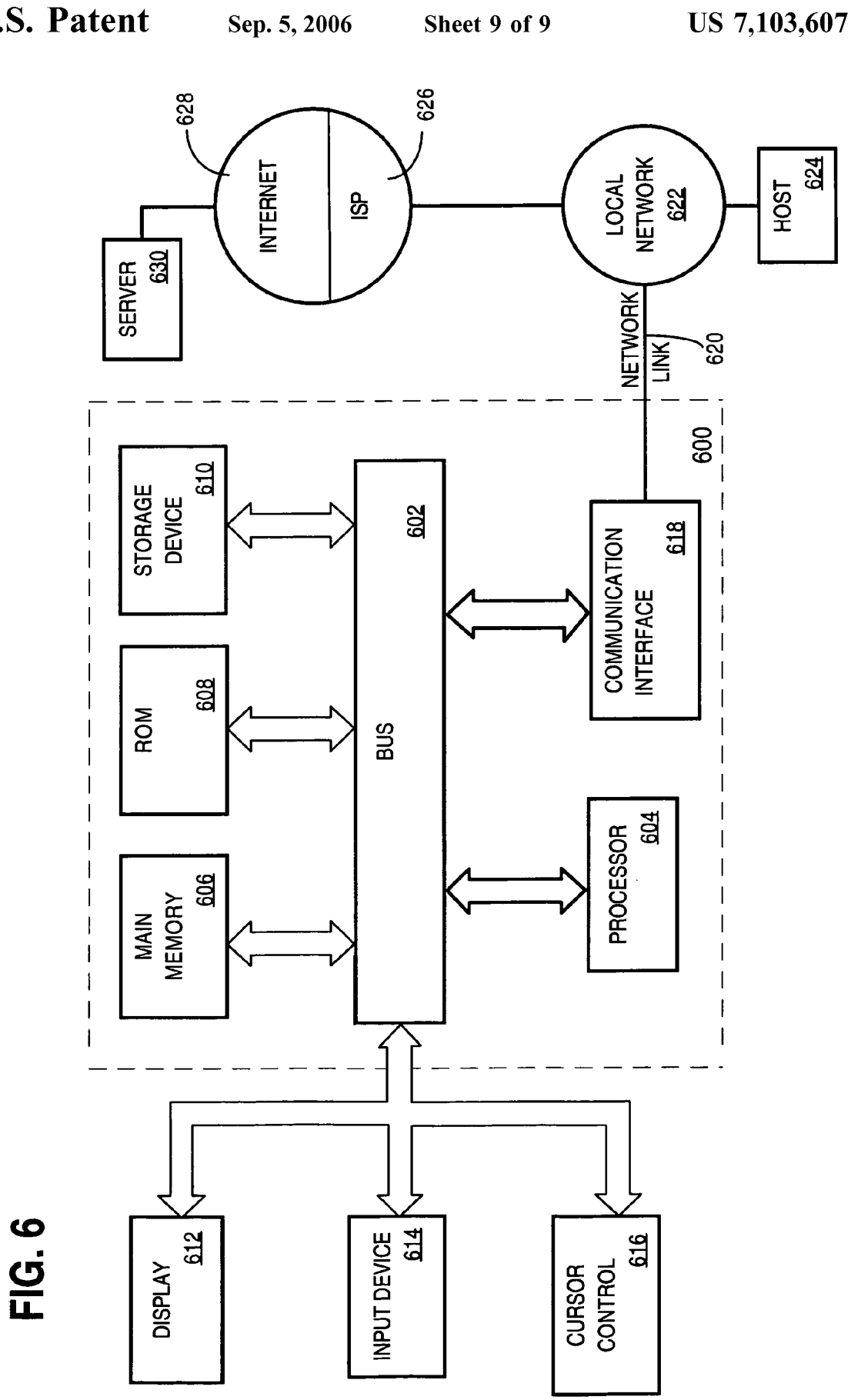
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for a method of responding to a request for data about an enterprise. According to one embodiment of the invention, a method of responding to a request for data about an enterprise is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for a method of responding to a request for data about an enterprise as described herein.

The received code may be executed by processor 604 as it is received, and/or stored in storage device 610, or other non-volatile storage for later execution. In this manner, computer system 600 may obtain application code in the form of a carrier wave.

7.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of responding to a request for data about an enterprise, the method comprising the steps of:

storing a plurality of names for a single entity associated with the enterprise as a first plurality of corresponding concepts in a database of concepts and relationships among concepts, which database describes a plurality of entities associated with the enterprise, wherein each name of the plurality of names is associated with a particular concept of the first plurality of corresponding concepts;

designating a first concept of the first plurality of corresponding concepts as a normative concept, wherein the normative concept is used to relate the single entity to other entities of the enterprise;

storing in the database a first relationship of a first relationship type, the first relationship defined for the first concept and an alternative concept of the first plurality of corresponding concepts, wherein the first relationship includes an attribute indicating the alternative concept is one of a synonym for the first concept, an acronym for the first concept and a translation into a different language than a language of the first name corresponding to the first concept;

storing in the database a second relationship of a second relationship type between the first concept and a second concept not among the first plurality of corresponding concepts, wherein the second concept is different than the first concept;

receiving a request including data indicating a particular name of the plurality of names, wherein the request does not include data indicating a first name corresponding to the first concept, wherein:

the particular name corresponds to a particular alternative concept of the first plurality of corresponding concepts, and the database does not include a relationship defined for the second concept and the particular alternative concept; and in response to receiving the request, sending a response including content of a file that is associated in the database with the second concept.

2. The method of claim 1, wherein the plurality of names include at least one of the synonym for the first name corresponding to the first concept, the acronym for the first name, and the translation of the first name into the different language than the language of the first name.

3. The method of claim 2, wherein the plurality of names includes the synonym for the first name; and wherein the synonym for the first name includes a misspelling of the first name.

4. The method of claim 2, wherein the plurality of names includes the synonym for the first name; and wherein the synonym for the first name comprises an acronym of the first concept or a translation into a different language than a language of the first name corresponding to the first concept.

5. The method of claim 1, further comprising the step of adding a name to the plurality of names based on the data included in the request.

6. The method of claim 1, wherein the entities include at least one of a set of products of the enterprise, a set of services of the enterprise and a set of activities of the enterprise.

7. The method of claim 6, wherein the entities include the set of activities of the enterprise; and wherein the set of activities of the enterprise include at least one of administration, research, marketing, joint ventures and documentation.

8. A computer-readable medium carrying one or more sequences of instructions for responding to a request for data about an enterprise, which instructions, when executed by one or more processors, cause the one or more processors to carry out the steps of:

storing a plurality of names for a single entity associated with the enterprise as a first plurality of corresponding concepts in a database of concepts and relationships among concepts, which database describes a plurality of entities associated with the enterprise, wherein each name of the plurality of names is associated with a particular concept of the first plurality of corresponding concepts;

indicating a first concept of the first plurality of corresponding concepts as a normative concept, wherein the normative concept is used to relate the single entity to other entities of the enterprise;

storing in the database a first relationship of a first relationship type, the first relationship defined for the first concept and an alternative concept of the first plurality of corresponding concepts, wherein the first relationship includes an attribute indicating the alternative concept is one of a synonym for the first concept, an acronym for the first concept and a translation into a different language than a language of the first name corresponding to the first concept;

storing in the database a second relationship of a second relationship type between the first concept and a second concept not among the first plurality of corresponding concepts, wherein the second concept is different than the first concept;

receiving a request including data indicating a particular name of the plurality of names, wherein the request does not include data indicating a first name corresponding to the first concept, wherein:

the particular name corresponds to a particular alternative concept of the first plurality of corresponding concepts, and the database does not include a relationship defined for the second concept and the particular alternative concept; and in response to receiving the request, sending a response including content of a file that is associated in the database with the second concept.

9. The computer-readable medium of claim 8, wherein the plurality of names include at least one of the synonym for the first name corresponding to the first concept, the acronym for the first name, and the translation of the first name into the different language than the language of the first name.

10. The computer-readable medium of claim 9, wherein the plurality of names includes the synonym for the first name; and wherein the synonym for the first name includes a misspelling of the first name.

11. The computer-readable medium of claim 8, wherein the instructions further cause the one or more processors to carry out the step of adding a name to the plurality of names based on the data included in the request.

12. The computer-readable medium of claim 8, wherein the entities include at least one of a set of products of the enterprise, a set of services of the enterprise and a set of activities of the enterprise.

13. The computer-readable medium of claim 12, wherein the entities include the set of activities of the enterprise; and wherein the set of activities of the enterprise include at least one of administration, research, marketing, joint ventures and documentation.

14. A system for responding to a request for data about an enterprise, the system comprising:

a means for storing a plurality of names for a single entity associated with the enterprise;

a means for indicating a first name of the plurality of names as a normative name, wherein the normative name is used to relate the single entity to other entities of the enterprise;

a means for storing a first relationship of a first relationship type, the first relationship defined for the first name and an alternative name of the plurality of names, wherein the first relationship includes an attribute indicating the alternative name is one of a synonym for the first name, an acronym for the first name, and a translation into a different language than a language of the first name;

a means for storing a second relationship of a second relationship type between the first name and particular information not among the plurality of names, wherein the particular information is different than the first name;

a means for receiving a request including data indicating a particular name of the plurality of names, wherein the request does not include data indicating the first name and the database does not include a relationship defined for the particular information and the particular name; and a means for sending a response including content of a file that is associated in a database with the particular information in response to receiving the request, which database describes a plurality of entities associated with the enterprise.

15. The system of claim 14, wherein the plurality of names include at least one of the synonym for the first name, the acronym for the first name, and the translation of the first name into the different language than the language of the first name.

16. The system of claim 15, wherein the plurality of names includes the synonym for the first name; and wherein the synonym for the first name includes a misspelling of the first name.

17. The system of claim 14, further comprising a means for adding a name to the plurality of names based on the data included in the request.

18. The system of claim 14, wherein the entities include at least one of a set of products of the enterprise, a set of services of the enterprise and a set of activities of the enterprise.

19. The system of claim 18, wherein the entities include the set of activities of the enterprise; and wherein the set of activities of the enterprise include at least one of administration, research, marketing, joint ventures and documentation.

20. A system for responding to a request for data about an enterprise, the system comprising:

a database of concepts and relationships among concepts describing a plurality of entities associated with the enterprise; and a processor configured to perform the steps of:

storing a plurality of names for a single entity associated with the enterprise as a first plurality of corresponding concepts in the database, wherein each name of the plurality of names is associated with a particular concept of the first plurality of corresponding concepts;

indicating a first concept of the first plurality of corresponding concepts as a normative concept, wherein the normative concept is used to relate the single entity to other entities of the enterprise;

storing in the database a first relationship of a first relationship type, the first relationship defined for the first concept and an alternative concept of the first plurality of corresponding concepts, wherein the first relationship includes an attribute indicating the alternative concept is one of a synonym for the first concept, an acronym for the first concepts and a translation into a different language than a language of the first name corresponding to the first concept;

storing in the database a second relationship of a second relationship type between the first concept and a second concept not among the first plurality of corresponding concepts, wherein the second concept is different than the first concept;

receiving a request including data indicating a particular name of the plurality of names, wherein the request does not include data indicating a first name corresponding to the first concept, wherein:

the particular name corresponds to a particular alternative concept of the first plurality of corresponding concepts, and the database does not include a relationship defined for the second concept and the particular alternative concept; and in response to receiving the request, sending a response including content of a file that is associated in the database with the second concept.

21. The system of claim 20, wherein the plurality of names include at least one of the synonym for the first name corresponding to the first concept, the acronym for the first name, and the translation of the first name into the different language than the language of the first name.

22. The system of claim 21, wherein the plurality of names includes the synonym for the first name; and wherein the synonym for the first name includes a misspelling of the first name.

23. The system of claim 20, the processor further configured to perform the step of adding a name to the plurality of names based on the data included in the request.

24. The system of claim 20, wherein the entities include at least one of a set of products of the enterprise, a set of services of the enterprise and a set of activities of the enterprise.

25. The system of claim 24, wherein the entities include the set of activities of the enterprise; and wherein the set of activities of the enterprise include at least one of administration, research, marketing, joint ventures and documentation.

* * * * *